US008179797B2

(12) United States Patent
Chandra et al.

(10) Patent No.: US 8,179,797 B2
(45) Date of Patent: May 15, 2012

(54) CHANNEL DISCOVERY AND DISCONNECTION IN NETWORKS OVER WHITE SPACES AND OTHER PORTIONS OF THE SPECTRUM

(75) Inventors: Ranveer Chandra, Kirkland, WA (US); Thomas Moscibroda, Redmond, WA (US); Rohan N. Murty, Cambridge, MA (US); Paramvir Bahl, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/473,951

(22) Filed: May 28, 2009

(65) Prior Publication Data
US 2010/0301992 A1 Dec. 2, 2010

(51) Int. Cl.
H04L 12/26 (2006.01)
(52) U.S. Cl. ........................................ 370/231
(58) Field of Classification Search .................. None
See application file for complete search history.

(56) References Cited

U.S. PATENT DOCUMENTS

| | | | |
|---|---|---|---|
| 6,114,971 | A | 9/2000 | Nysen |
| 6,788,702 | B1 | 9/2004 | Garcia-Luna-Aceves et al. |
| 6,895,512 | B1 * | 5/2005 | Calbucci ............................ 726/3 |
| 7,174,145 | B2 | 2/2007 | Chatelier et al. |
| 7,287,077 | B2 * | 10/2007 | Haugh et al. .................. 709/225 |
| 2006/0115012 | A1 | 6/2006 | Sadowsky et al. |
| 2007/0247139 | A1 | 10/2007 | Veroni et al. |
| 2008/0095100 | A1 | 4/2008 | Cleveland et al. |
| 2008/0095135 | A1 | 4/2008 | Cleveland et al. |
| 2008/0130519 | A1 | 6/2008 | Bahl et al. |
| 2008/0165754 | A1 | 7/2008 | Hu |
| 2008/0232487 | A1 | 9/2008 | Cleveland et al. |
| 2008/0256606 | A1 * | 10/2008 | Koikara et al. .................. 726/4 |
| 2008/0261639 | A1 | 10/2008 | Sun et al. |
| 2008/0320529 | A1 | 12/2008 | Louchkoff et al. |
| 2009/0034457 | A1 | 2/2009 | Bahl et al. |
| 2009/0061783 | A1 | 3/2009 | Choi et al. |

FOREIGN PATENT DOCUMENTS

| | | |
|---|---|---|
| KR | 1020080036534 A | 4/2008 |
| KR | 1020080098263 A | 11/2008 |
| WO | 2006083495 A2 | 8/2006 |

OTHER PUBLICATIONS

International Search Report for Application No. PCT/US2010/036752 (corresponding to U.S. Appl. No. 12/473,951), mailed on Dec. 31, 2010, 9 pages.
International Search Report for Application No. PCT/US2010/036756 (corresponding to U.S. Appl. No. 12/473,963), mailed on Dec. 29, 2010, 9 pages.

(Continued)

*Primary Examiner* — Raj Jain
(74) *Attorney, Agent, or Firm* — The Law Office of Michael E. Kondoudis

(57) ABSTRACT

Functionality is described for discovering a channel within an environment in which non-privileged entities have subordinate access rights to spectrum compared to privileged entities. The functionality operates by investigating spectrum units within the spectrum for the presence of the channel. In one case, the functionality operates by investigating the spectrum units in linear succession; in another case, the functionality advances in a staggered fashion over the available spectrum. Functionality is also described for handling disconnection by a node from a channel. The functionality allows the node to convey its disconnection status to other communication participants. In one case, various aspects of the functionality are implemented by performing analysis in the time domain.

15 Claims, 12 Drawing Sheets

OTHER PUBLICATIONS

"Cognitive Radio Networks," retrieved at <<http://www.ece.gatech.edu/research/labs/bwn/CR/Projectdescription.html>>, retrieved on Apr. 2, 2009, 13 pages.

Matinmikko, et al., "Cognitive Radio: An Intelligent Wireless Communication System," VTT Technical Research Centre, Oulu, Finland, Research Report No. VTT-R-02219-08, retrieved at <<http://www.vtt.fi/inf/julkaisut/muut/2008/CHESS_Research_Report.pdf>>,Mar. 14, 2008, 155 pages.

Liu, et al., "Sensing-based Opportunistic Channel Access," Mobile Networks and Applications, vol. 11, Issue 4, Aug. 2006, retrieved at <<http://www.cs.ucdavis.edu/~liu/paper/sensing.pdf>>, 28 pages.

Garroppo, et al., "Notes on Implementing a IEEE 802.11s Mesh Point," slide presentation at 4th International Workshop of the EuroNGI/EuroFGI Network of Excellence, Barcelona, Spain, Jan. 16-18, 2008, retrieved at <<http://recerca.ac.upc.edu/eurongi08/slides/6-1-s.pdf>>, 39 pages.

Alocci, et al., "Development of an IEEE 802.11s Simulation Model for QualNet," Networking and Electronic Commerce Research Conference (NAEC2008), Sep. 25-28, 2008, retrieved at <<http://www.csi.ucd.ie/Staff/jmurphy/publications/1551.pdf>>, 9 pages.

Chandra, et al., "Wireless Networking in the TV Bands," slide presentation, Microsoft Corporation, retrieved at <<http://sdr08.cs.ucdavis.edu/sdr-workshop.ppt>>, retrieved on Apr. 2, 2009, 34 pages.

"IEEE 802.22 Working Group on WRANs," web page for IEEE 802 LAN/MAN Standards Committee, retrieved at <<http://www.ieee802.org/22/>>, retrieved on Mar. 31, 2009, 2 pages.

Web page for Scalable Network Technologies, Inc., Los Angeles, California, retrieved at <<http://www.scalable-networks.com>>, retrieved on Mar. 31, 2009, 1 page.

Web page for "TV Fool," retrieved at <<http://www.tvfool.com>>, retrieved on Mar. 31, 2009, 4 pages.

Web page for Ettus Research LLC, Mountain View, California, retrieved at <<http://www.ettus.com>>, retrieved on Mar. 31, 2009, 2 pages.

"USRP FAQ," Ettus Research LLC, Mountain View, California, retrieved at <<http://www.ettus.com/faq.html>>, retrieved on Mar. 31, 2009, 7 pages.

"FCC Acts to Expedite DTV Transition and Clarify DTV Build-Out Rules," news release from the Federal Communications Commission, Nov. 8, 2001, retrieved at <<http://www.fcc.gov/Bureaus/Mass_Media/News_Releases/2001/nrmm0114.html>>, 3 pages.

Web page for IEEE Symposia on New Frontiers in Dynamic Spectrum Access Networks, Demonstrations and Experimentation, IEEE DySPAN 2008, Oct. 14-17, 2008, retrieved at <<http://cms.comsoc.org/eprise/main/SiteGen/DYSPAN_2008/Content/Home/demonstrations.html>>, retrieved on Mar. 31, 2009, 20 pages.

Jones, et al., "Evaluation of the Performance of Prototype TV-Band White Space Devices Phase II," FCC/OET 08-TR-1005, Federal Communications Commission, Oct. 15, 2008, retrieved at <<http://hraunfoss.fcc.gov/edocs_public/attachmatch/DA-08-2243A3.pdf>>, 49 pages.

"FCC Adopts Rules for Unlicensed Use of Television White Spaces," news release from the Federal Communications Commission, Nov. 4, 2008, retrieved at <<hraunfoss.fcc.gov/edocs_public/attachmatch/DOC-286566A1.pdf>>, 2 pages.

Borth, et al., "Considerations for Successful Cognitive Radio Systems in US TV White Space," Proceedings of the 3rd IEEE Symposium on New Frontiers in Dynamic Spectrum Access Networks, Oct. 14-17, 2008, retrieved at <<http://ieeexplore.ieee.org/stamp/stamp.jsp?tp=&isnumber=&arnumber=4658272>>, 5 pages.

Cabric, et al., "Experimental Study of Spectrum Sensing Based on Energy Detection and Network Cooperation," Proceedins of the First International Workshop on Technology and Policy for Accessing Spectrum, 2006, retrieved at <<http://delivery.acm.org/10.1145/1240000/1234400/a12-cabric.pdf?key1=1234400&key2=4956848321&coll=GUIDE&dl=GUIDE&CFID=29023570&CFTOKEN=14990252>>, 8 pages.

Chandra, et al., "A Case for Adapting Channel Width in Wireless Networks", Proceedings of the ACM SIGCOMM 2008 Conference on Applications, Technologies, Architectures, and Protocols for Computer Communications, vol. 38, No. 4, Aug. 17-22, 2008, retrieved at <<http://ccr.sigcomm.org/online/files/p135-chandra.pdf>>, pp. 135-146.

Jamieson, et al., "PPR: Partial Packet Recovery for Wireless Networks," Proceedings of the 2007 Conference on Applications, Technologies, Architectures, and Protocols for Computer Communications, 2007, retrieved at <<http://nms.lcs.mit.edu/papers/fp315-jamieson.pdf>>, 12 pages.

Kim, et al., "Fast Discovery of Spectrum Opportunities in Cognitive Radio Networks," Proceedings of the 3rd IEEE Symposium on New Frontiers in Dynamic Spectrum Access Networks, Oct. 14-17, 2008, retrieved at <<http://kabru.eecs.umich.edu//papers/publications/2008/main.pdf>>, 12 pages.

Kim, et al., "In-Band Spectrum Sensing in Cognitive Radio Networks: Energy Detection or Feature Detection," The 14th Annual International Conference on Mobile Computing and Networking, Sep. 14-19, 2008, retrieved at <<http://kabru.eecs.umrich.edu//papers/publications/2008/com0950-kim.pdf>>, 12 pages.

Moscibroda, et al., "Load-Aware Spectrum Distribution in Wireless LANs," IEEE International Conference on Network Protocols, Oct. 19-22, 2008, retrieved at <<http://www.ieee-icnp.org/2008/papers/Index14.pdf>>, pp. 137-146.

Narlanka, et al., "A Hardware Platform for Utilizing the TV Bands with a Wi-Fi Radio," Proceedings of the 15th IEEE Workshop on Local and Metropolitan Area Networks, Jun. 10-13, 2007, retrieved at <<http://ieeexplore.ieee.org/stamp/stamp.jsp?tp=&isnumber=&arnumber=4295974>>, pp. 49-53.

Rahl, et al., "Learning to Share: Narrowband-Friendly Wideband Wireless Networks," Proceedings of the ACM SIGCOMM 2008 Conference on Applications, Technologies, Architectures, and Protocols for Computer Communications, Aug. 17-22, 2008, retrieved at <<http://portal.acm.org/ft_gateway.cfm?id=1402976&type=pdf&coll=GUIDE&dl=GUIDE&CFID=28293910&CFTOKEN=21748983>>, pp. 147-158.

Rix, et al., "Perceptual Evaluation of Speech Quality (PESQ)—A New Method for Speech Quality Assessment of Telephone Networks and Codecs," Proceedings of the 2001 IEEE International Conference Acoustic, Speech, and Signal Processing, vol. 2, 2001, retrieved at <<http://ieeexplore.ieee.org/stamp/stamp.jsp?tp=&isnumber=&arnumber=941023>>, pp. 749-752.

Tan, et al., "SORA: High Performance Software Radio Using General Purpose Multi-core Processors," Proceedings of the 6th USENIX Symposium on Networked Systems Design and Implementation, 2009, retrieved at <<http://research.microsoft.com/pubs/79927/Sora-camera-ready.pdf>>, 16 pages.

Tandra, et al., "SNR Walls for Signal Detection," IEEE Journal on Selected Topics in Signal Processing, vol. 2, No. 1, Feb. 2008, retrieved at <<http://www.eecs.berkeley.edu/~sahai/Papers/tandra_sahai_13_revised_submission.jstsp.final.pdf>>, 30 pages.

Yuan, et al., "KNOWS: Kognitiv Networking Over White Spaces," Proceedings of the IEEE DySPAN, Apr. 17-20, 2007, retrieved at <<http://research.microsoft.com/en-us/groups/nrg/dyspan07.pdf>>, 12 pages.

"Building Software Radio Systems: The USRP Product Family," Ettus Research LLC, Mountain View, California, retrieved at <<http://www.ettus.com>>, retrieved on Aug. 8, 2009, 2 pages.

"USRP—Frequently Asked Questions," GNU Radio, the GNU Software Radio, retrieved at <<http://gnuradio.org/trac/wiki/UsrpFAQ>>, retrieved on Aug. 8, 2009, 1 page.

Ghosh, et al., "A Cognitive Radio Prototype Operating in UHF TV Bands," IEEE Symposia on New Frontiers in Dynamic Spectrum Access Networks, Demonstrations and Experimentation, IEEE DySPAN 2008, Oct. 14-17, 2008, retrieved at http://cms.comsoc.org/SiteGen/Uploads/Public/Docs_DYSPAN_2008/Philips_Demo_IEEEDySPAN2008.pdf>>, 4 pages.

Jones, et al., "Initial Evaluation of the Performance of Prototype TV-Band White Space Devices," FCC/OET 07-TR-1006, Federal Communications Commission, Jul. 31, 2007, retrieved at <<http://www.nab.org/xert/corpcomm/pressrel/releases/073107_FCCOET_WhiteSpaces.pdf>>, 85 pages.

"SLX Wireless System Specifications," SHURE Incorporated, Niles, Illinois, 2004, retrieved at <<http://www.fullcompass.com/common/files/3227-SLX-Series%20Shure%20specs.pdf>>, retrieved on Aug. 8, 2009, 3 pages.

Bahl, Victor, "White Space Networking—Is It Wi-Fi on Steroids?," Event description by University of Washington at St. Louis, Apr. 10, 2009, retrieved at <<http://www.cse.seas.wustl.edu/About/Events.asp?EventType=All%20Events&EventID=1687>>, retrieved on Aug. 8, 2009, 2 pages.

Plummer, et al., "A Cognitive Spectrum Assignment Protocol Using Distributed Conflict Graph Construction," IEEE Military Communications Conference, 2007, Oct. 29-31, 2007, retrieved at <<http://ieeexplore.ieee.org/stamp/stamp.jsp?arnumber=04455299>>, 7 pages.

Spiegel, Dana, "NYCwireless Testimony for NY City Council Hearing: The Regulation and Use of the Unallocated Portion of the Radio Spectrum, Also Known as White Spaces," Sep. 29, 2008, retrieved at <<http://www.nycwireless.net/2008/09/nycwireless-testimony-for-ny-city-council-hearing-the-regulation-and-use-of-the-unallocated-portion-of-the-radio-spectrum-also-known-as-white-spaces/>>, 3 pages.

Subramani, et al., "Spectrum Scanning and Reserve Channel Methods for Link Maintenance in Cognitive Radio Systems," IEEE Vehicular Technology Conference, May 11-14, 2008, retrieved at <<http://ieeexplore.ieee.org//stamp/stamp.jsp?tp=&arnumber=0452996>>, pp. 1944-1948.

* cited by examiner

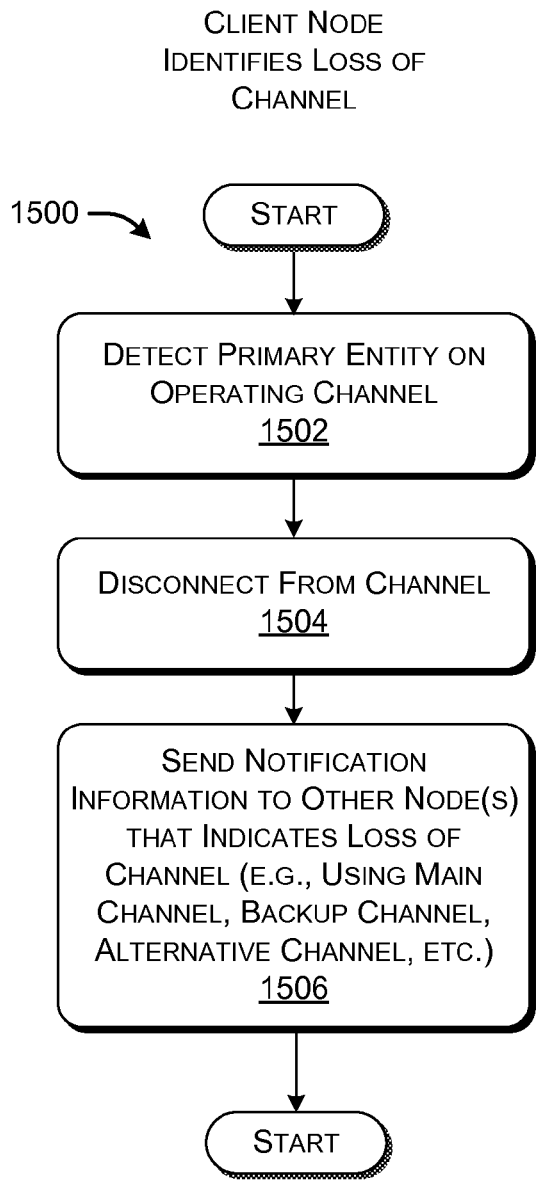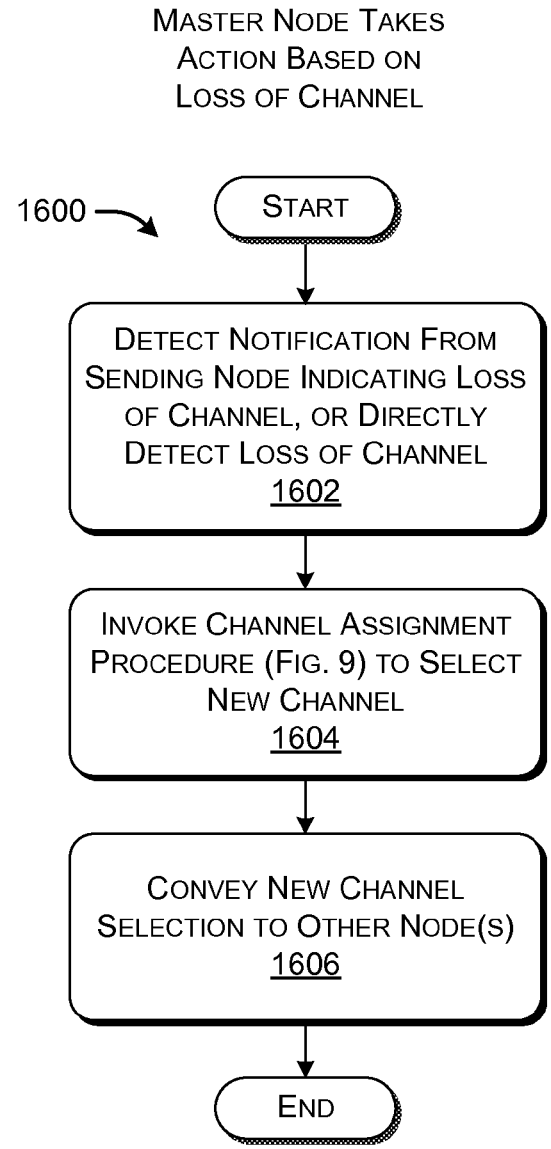
FIG. 15
FIG. 16

CHANNEL DISCOVERY AND DISCONNECTION IN NETWORKS OVER WHITE SPACES AND OTHER PORTIONS OF THE SPECTRUM

BACKGROUND

An appropriate rule-making authority may occasionally reconsider the rules that govern the use of a particular portion of the wireless communication spectrum. The authority may initiate such reconsideration in view of advances in technology and changes in consumer needs. In general, historical considerations that were relevant at the time of enactment of the rules may no longer apply in full force. Moreover, new considerations may now apply which were not foreseen at the time of enactment of the rules.

A change in the rules may allow a tremendous expansion in the usefulness of a particular portion of the spectrum. However, such a change may also introduce significant technical challenges. For example, in the United States, the FCC recently modified the rules governing the use of TV spectrum. Historically, the rules reserve that portion of the spectrum for television transmissions and wireless microphones. Such licensed entities are referred to as privileged entities herein. The FCC ruling expands the use of this portion of the spectrum to other, non-licensed, communication devices. However, the FCC ruling states that the new devices are not permitted to interfere with the privileged entities. Such unlicensed entities are referred to as non-privileged entities herein because they have subordinate rights to the available spectrum compared to the privileged entities. By contrast, there are no such constraints governing the use of communication devices in ISM bands (used for Wi-Fi communication). It is a challenging task to develop devices which make efficient use of the unoccupied TV spectrum—which is commonly known as white spaces—under the constraints of the FCC ruling. Similar rule changes and associated challenges may apply to other rule-making jurisdictions and other portions of the spectrum.

In other cases, the rules governing a particular portion of the wireless spectrum have not changed. Here too, there remains potential for making more efficient use of the spectrum, e.g., by revisiting traditional paradigms that have governed the use of the spectrum.

SUMMARY

According to one illustrative implementation, functionality is described for discovering a channel that can be used to conduct communication among nodes. The functionality operates by investigating the spectrum units within an available spectrum according to a specified search strategy. The spectrum units may correspond to underlying TV channels (in one illustrative and non-limiting case). The functionality investigates a spectrum unit by determining whether it is at least part of a channel. The functionality performs this task by determining whether a characteristic signal is obtained over the spectrum unit that is associated with the channel, even though the spectrum unit may only partially overlap the channel.

If a channel is detected, the functionality further examines the characteristic signal obtained over the spectrum unit, e.g., by examining a characteristic pattern in the signal. The functionality derives the width and center frequency of the channel based on the characteristic signal. Once the width and center frequency of the channel are determined, nodes can communicate using this channel.

According to one illustrative feature, the functionality is applied in an environment in which the spectrum is shared by privileged entities and non-privileged entities, the non-privileged entities having subordinate rights to the spectrum compared to the privileged entities. The functionality is used by the second entities to discover a channel; for example, a node can use the functionality to discover an access point device with which it may communicate.

According to one illustrative implementation, a channel used by one node (such as a node associated with an access point device) can have a variable width which is not known to other nodes in advance of the discovery of this channel by the other nodes. In other words, a channel can encompass any number of underlying spectrum units (e.g., TV channels in one example). The center frequency of the channel is also not known to the other nodes. The functionality can discover the channel without examining all permissible channel permutations having different respective center frequencies and widths.

According to a linear search strategy, the functionality operates by examining each spectrum unit within the available spectrum in linear succession. According to a staggered search strategy, the functionality examines spectrum units within the available spectrum in staggered fashion, skipping over one or more spectrum units in a linear succession of spectrum units. The skipping is performed to investigate the available spectrum for the presence of the channel on a class-width-by-class-width basis, starting with the largest class width first.

According to another illustrative implementation, functionality is described for handling disconnection from a channel. The functionality, when implemented by a first node, operates by detecting a presence of a privileged entity operating on a channel that is being used by the first node to communicate with a second node (such as an access point device). The first node and the second node are associated with non-privileged entities, where, as stated, the non-privileged entities have subordinate access rights compared to the privileged entity. The functionality then operates by disconnecting the first node from the channel. In one example, disconnection is appropriate because the first node and the second node, being non-privileged entities, are no longer allowed to communicate on the channel in which a privileged entity suddenly begins transmitting (or is suddenly discovered to be transmitting). The functionality then entails sending notification information from the first node to the second node. The notification information informs the second node that the first node has lost its connection to the channel.

According to one illustrative feature, the functionality can notify the second node via a backup channel, e.g., using a chirping protocol or the like. In addition, the functionality can notify the second node via an alternative channel if a backup channel is determined to be unavailable.

According to another illustrative implementation, functionality is described for extracting information from a spectrum using time domain analysis. The functionality operates by investigating a plurality of spectrum units in the time domain to identify a characteristic signal. The functionality then derives information based on the characteristic signal, to provide derived information. The functionality then governs communication among at least two nodes based on the derived information.

According to one illustrative feature, the functionality can use time domain analysis to facilitate the discovery of a channel in the manner summarized above. For example, the functionality can use a characteristic pattern in the signal to derive at least the width of a channel. The functionality can then uses the identified channel to handle communication among nodes.

According to another illustrative feature, the functionality can use time domain analysis to handle disconnection from the channel in the manner summarized above. For example, the functionality can use time domain analysis to detect telltale chirping activity (or other activity) on a backup or alternative channel, indicating that a node has disconnected from its channel.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 15 shows an illustrative procedure that explains how a disconnection management module (of FIG. 5) can be used to identify a loss of a channel, and to communicate that loss of the channel to other communication participants.

FIG. 16 shows an illustrative procedure that explains how the disconnection management module can be used to detect notification information which alerts it that a communication participant has lost its channel; FIG. 16 also explains how the disconnection management module can initiate the selection of another channel in response to the notification information.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for handling various aspects of communication in an environment in which privileged entities share spectrum with non-privileged entities. The non-privileged users have subordinate rights to the spectrum compared to the privileged users, as will be explained in detail below. The functionality can also be used in other types of environments.

This disclosure is organized as follows. Section A describes illustrative systems for handling communication in the above-described type of environment that includes privileged and non-privileged entities. Section B describes illustrative methods which explain the operation of the system of Section A. Section C describes illustrative processing functionality that can be used to implement any aspect of the features described in Sections A and B.

Figure 17:
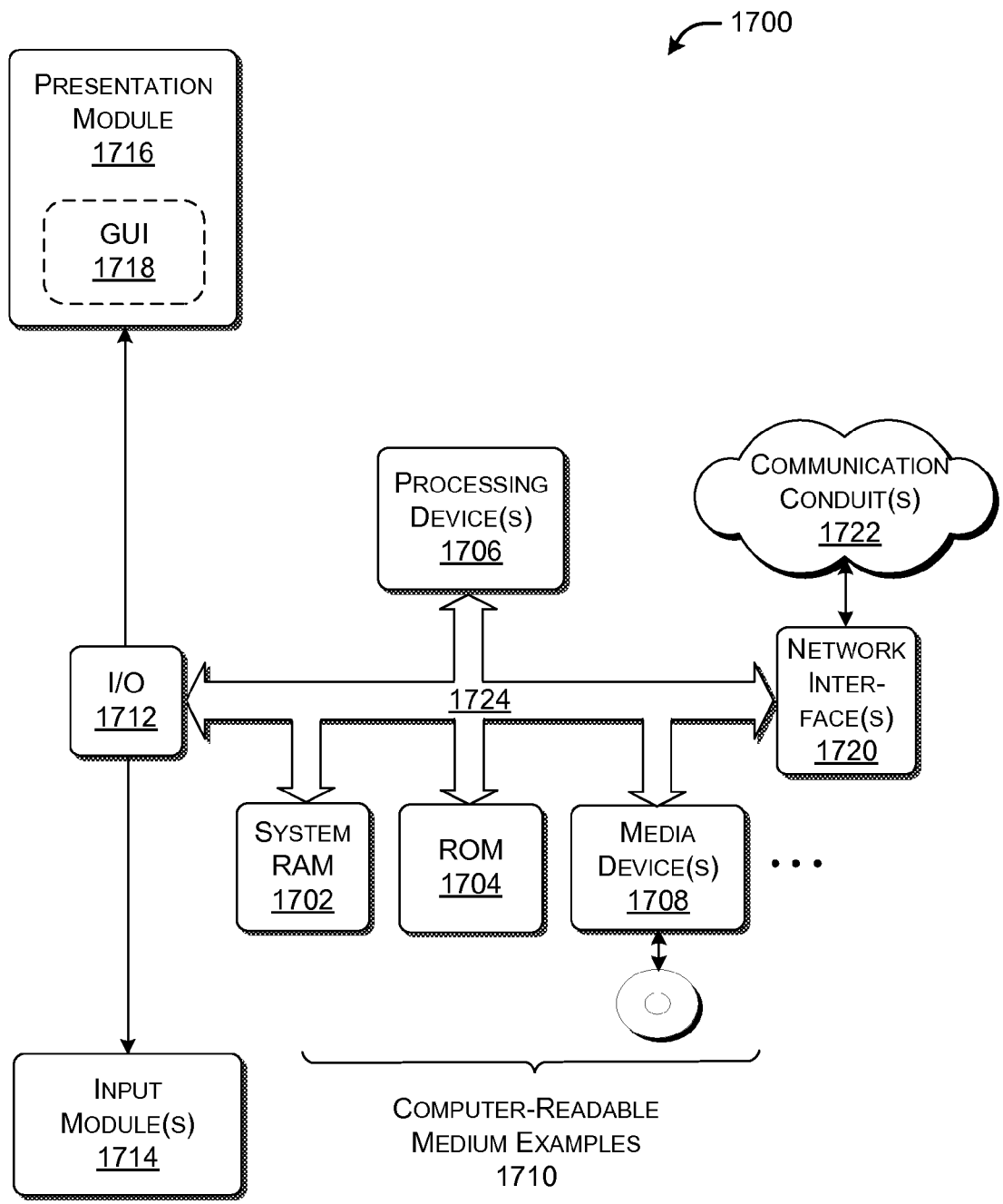
FIG. 17 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 17, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. Illustrative Environment

Figure 1:
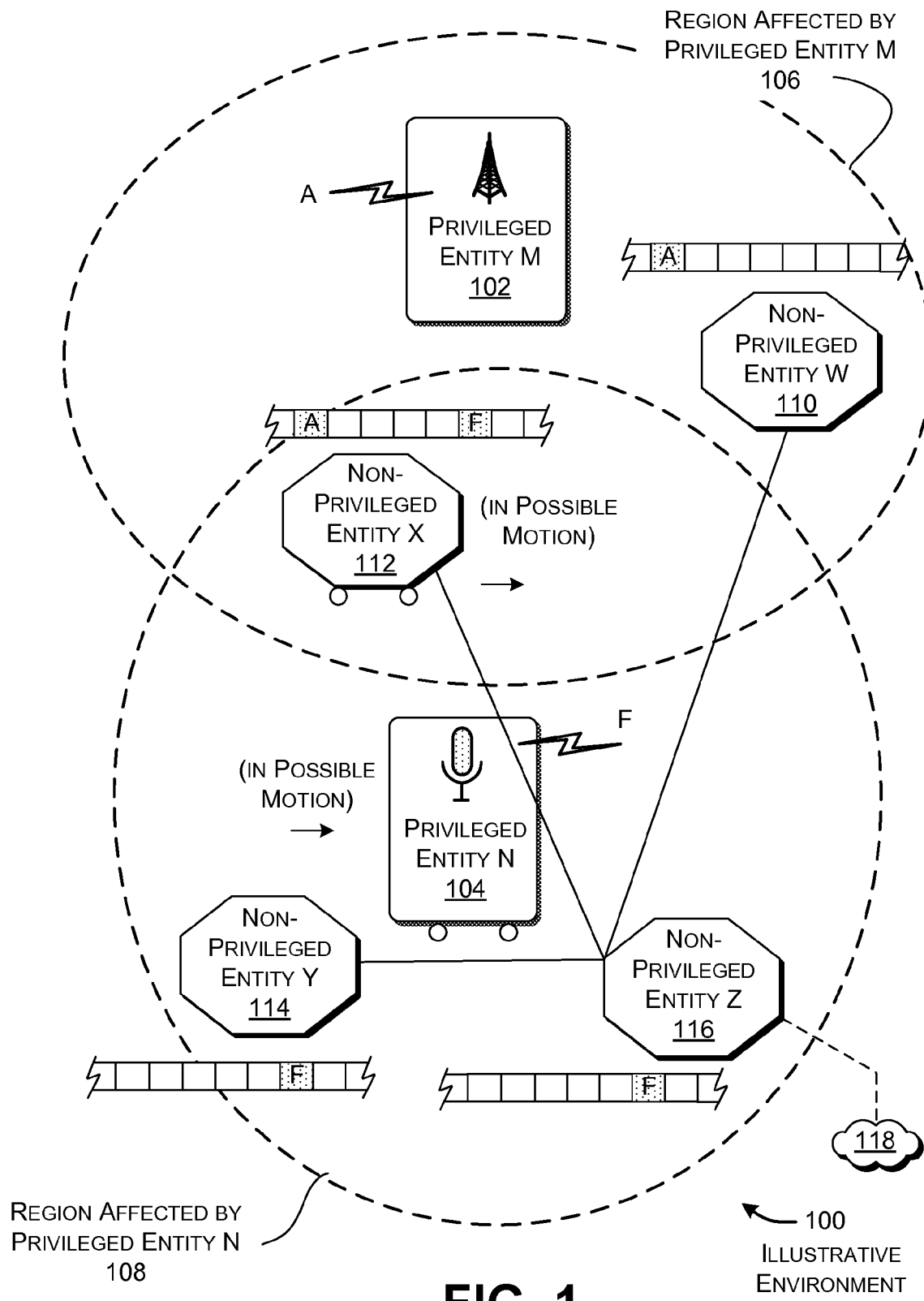
FIG. 1 shows an illustrative environment in which privileged entities share a portion of a wireless communication spectrum with non-privileged entities.

FIG. 1 shows an illustrative environment 100 in which privileged entities and non-privileged entities share a portion of a wireless communication spectrum. As described above, a privileged entity is an entity which has superior rights to the spectrum compared to a non-privileged entity. FIG. 1 shows two representative privileged entities, namely privileged entity M 102 and privileged entity N 104. Privileged entity M 102 has a range of influence corresponding to region 106. Privileged entity N 104 has a range of influence corresponding to region 108. Generally, the range of influence refers to a geographic range of coverage in which entities can receive or are otherwise affected by the signals transmitted by the privileged entities (102, 104), as defined by any jurisdiction-specific rules and/or other considerations. FIG. 1 shows four representative non-privileged entities, namely non-privileged entity W 110, non-privileged entity X 112, non-privileged entity Y 114, and non-privileged entity Z 116.

The environment 100 can correspond to any contextual setting governed by any rule-making jurisdiction (or no rule-making jurisdiction). Further, the environment 100 can provide communication in any portion (or portions) of a wireless communication spectrum (e.g., an electromagnetic communication spectrum). To facilitate explanation, the following discussion presents the concrete illustrative example in which the environment 100 corresponds to an expansion of the use of the TV spectrum, as governed in the United Stated by the FCC. The unoccupied TV spectrum is commonly known as white spaces. In the UHF spectrum, this portion includes, but is not limited to, 180 MHz of available bandwidth from channel 21 (512 MHz) to channel 51 (698 MHz), with the exception of channel 37. Additional TV spectrum is available in the VHF portion of the spectrum. To repeat, this example should be construed as representative and non-limiting. The principles described herein are not limited to any particular portion of a wireless communication spectrum. Nor are the principles limited to any particular country or other rule-making authority.

In the context of white spaces, the privileged entities correspond to television transmitters and wireless microphones. These entities represent licensed users of the spectrum; that is, as set forth by the FCC, these entities are the original intended users of the spectrum and the TV channels correspond to TV broadcast channels. The non-privileged entities correspond to any other users of the spectrum. As per the FCC ruling, a non-privileged entity cannot communicate on a portion of the spectrum currently being used by a privileged entity, if within a coverage area of that privileged entity. Further, if a privileged entity begins to transmit on a portion of the spectrum being used by a non-privileged entity, it is appropriate that the non-privileged entity immediately vacate that portion of the spectrum. Because of these priority-based rules, the privileged entities are said to have superior rights to the spectrum compared to the non-privileged entities, and the non-privileged entities are said to have subordinate rights compared to the privileged entities. Other rule-making jurisdictions may promulgate different rules governing access to the spectrum. The principles described herein are not limited to any particular rules governing use of the communication spectrum.

FIG. 1 shows the merely representative case in which non-privileged entity Z 116 serves as an access point device which provides access to a resource of any type. For example, the resource may represent a network 118 of any type, such as a local area network, a wide area network (such as the Internet), a telecommunication network, etc. The other non-privileged entities (W 110, X 112, and Y 114) communicate with the non-privileged entity Z 116 in order to gain access to the network 118 (or other resource). In a common application, for instance, the non-privileged entities (W 110, X 112, and Y 114) are computer-type devices and the non-privileged entity Z 116 is a router or base station of any type that provides access to the network 118. In this context, the non-privileged entity Z 116 operates in the role of a master, while the non-privileged entities (W 110, X 112, and Y 114) each act in the role of a slave.

However, the principles described herein are not limited to the above-described relationship among non-privileged entities. In another case, any two or more non-privileged entities can communicate with each other using point-to-point communication. In another case, any two or more non-privileged entities can form a local network of any type, such as a mesh network or an ad hoc network. The non-privileged entities can use that local network to transact local transactions amongst themselves and/or to interact with a more encompassing network, such as network 118. Still other paradigms and protocols may apply to the interaction among non-privileged entities.

Figure 4:
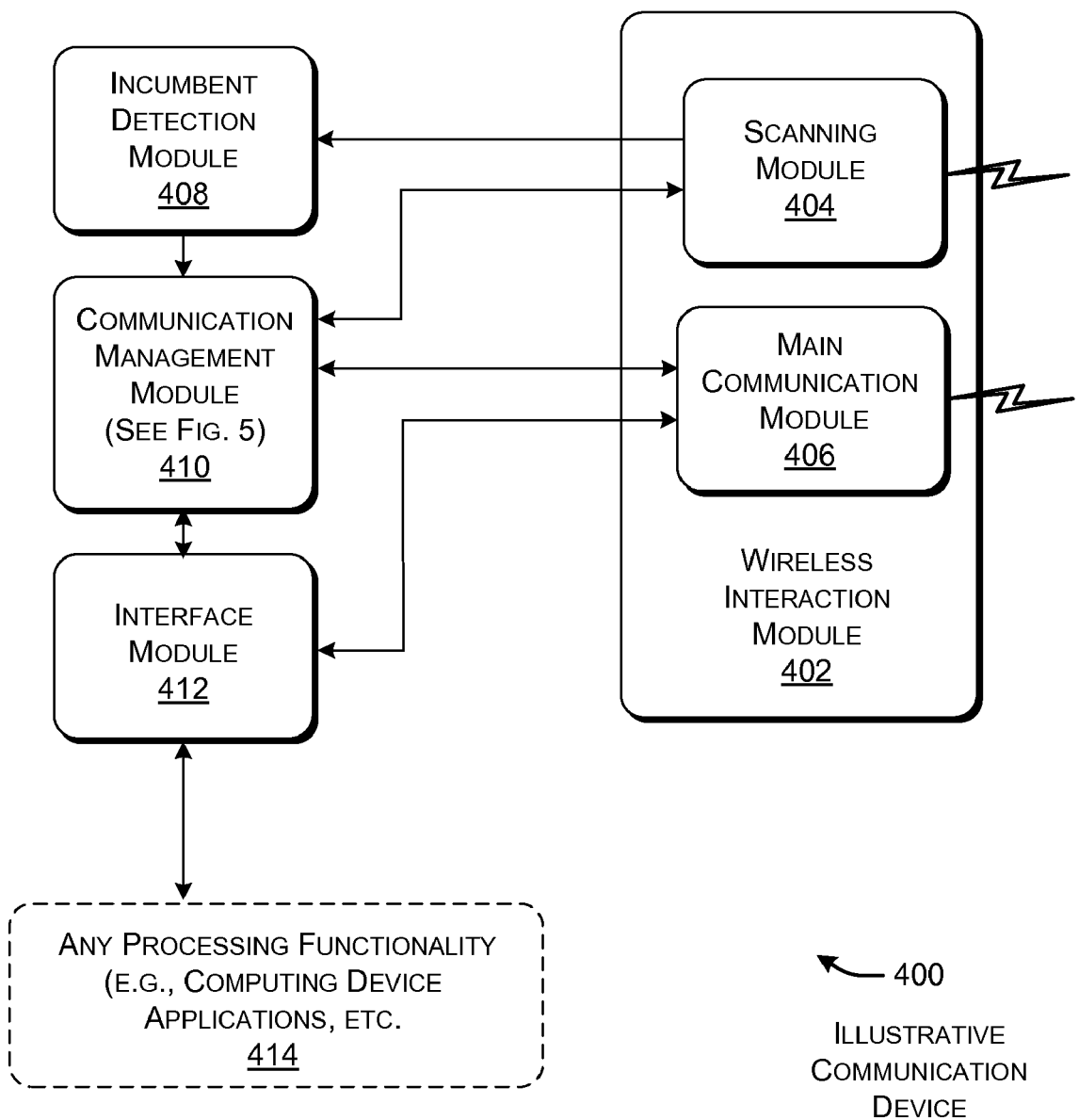
FIG. 4 shows an illustrative communication device for conducting communication within the environment of FIG. 1.

In the following discussion, the non-privileged entities can most generically be referred to as nodes. Thus, many of the principles can be framed in a general framework of a first node in communication with a second node. As explained above, the two nodes can have a master-slave relationship, a peer-to-peer relationship, and so on. The non-privileged entities can be implemented by communication devices of any kind. FIG. 4, to be discussed in turn, shows one such illustrative communication device.

On the topic of terminology, the term spectrum unit refers to any segment of available spectrum. For example, the TV spectrum is divided into a number of channels, which are referred to as spectrum units herein. The segments of the spectrum are referred to as spectrum units, rather than channels, because the term channel is used in another context, as will be clarified in the course of the ensuing discussion. As one example, the TV spectrum is commonly partitioned into 6 MHz-wide spectrum segments because 6 MHz is the width of an individual TV broadcast transmission. In Europe, the channels are 8 MHz wide.

The use of privileged and non-privileged entities in the same portion of the wireless spectrum contributes to three salient characteristics of the environment 100: spectrum variation; spectrum fragmentation; and spectrum temporality. These features are explored in greater detail below.

Spectrum variation means that the number and type of privileged entities that affect a particular region varies from location to location. For example, assume that privileged entity M 102 is using a spectrum unit that is generically labeled as "A," while privileged entity N 104 is using a spectrum unit that is generically labeled as "F." For instance, spectrum units A and F may correspond to respective channels in the TV spectrum. All entities within region 106 are affected by privileged entity M 102, transmitting on spectrum unit A. All entities within region 108 are affected by privileged entity N 104, transmitting on spectrum unit F. As such, non-privileged entity W 110 cannot use spectrum unit A due to the presence of privileged entity M 102, but is not constrained by privileged entity N 104. Non-privileged entity Y 114 and non-privileged entity Z 116 cannot use spectrum unit F due to the presence of privileged entity N 104, but are not constrained by privileged entity M 102. And non-privileged entity X 112 cannot use spectrum units A and F due to the presence of both privileged entity M 102 and privileged entity N 104. The following explanation will set forth additional considerations that restrict the spectrum that is availability to any non-privileged entity.

Figure 2:
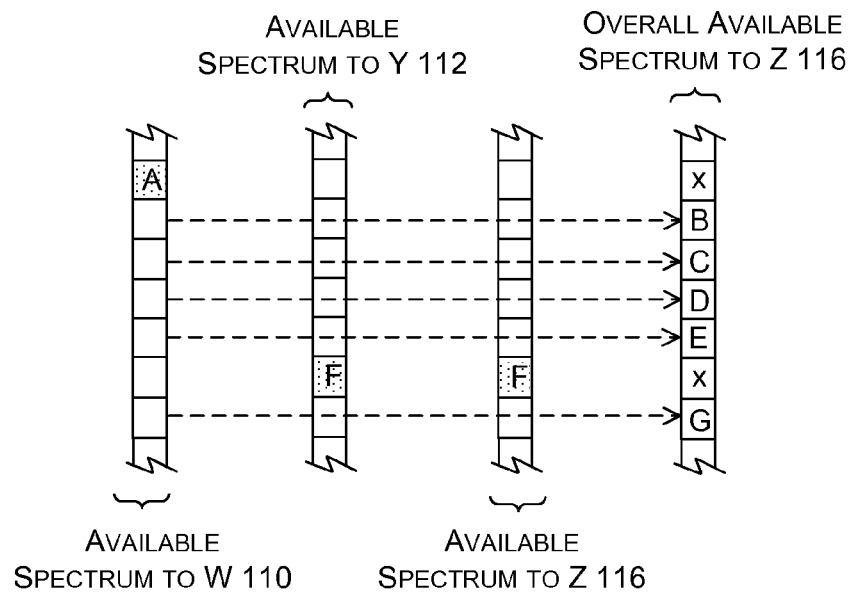
FIG. 2 shows an illustrative derivation of spectrum availability by taking a logical intersection of two spectrum maps.

Spectrum fragmentation means that the presence of privileged entities breaks up the spectrum that is available for transmission to the non-privileged entities. For example, consider the spectrum as "seen by" non-privileged entity X 112. Non-privileged entity X 112 detects that it can transmit on neither spectrum unit A nor spectrum unit F. This means that the available portions of the spectrum are fragmented by the unavailability of spectrum unit A and spectrum unit F. That is, the totality of available spectrum no longer forms a contiguous band, but is partitioned into chunks separated from each other by spectrum units used by privileged entities (in this case, spectrum unit A and spectrum unit F). Here, there are four spectrum units available between spectrum unit A and spectrum unit F (corresponding to generically labeled spectrum units B, C, D, and E, as shown in FIG. 2, to be discussed). But generally, the available spectrum as "seen by" by any non-privileged entity can include any dispersal of available and unavailable spectrum units.

Spectrum temporality means that the presence of privileged entities that affect a particular region may change over time. For example, a privileged entity can become active or inactive at any particular time without warning to the non-privileged entities. For example, a user can switch on or off a wireless microphone at any time without warning. Further, temporality may ensue from the fact that any of the privileged entities and/or non-privileged entities can be in motion. For example, FIG. 1 indicates that privileged entity N 104 is in possible motion and non-privileged entity X 112 is in possible position.

With the above characteristics in mind, consider the example in which non-privileged entity W 110 and non-privileged entity Y 114 seek to communicate with non-privileged entity Z 116. In this case, non-privileged entity W 110 is affected by privileged entity M 102 operating on spectrum unit A, while non-privileged entity Y 114 and non-privileged entity Z 116 are affected by privileged entity N 104 operating on spectrum unit F. To ensure overall interference-free interaction, it is desirable that the interaction between non-privileged entities W 110, Y 114, and Z 116 takes place on a channel that is free to all non-privileged entities (W 110, Y 114, and Z 116).

FIG. 2 illustrates the above concept in graphical form, where the identified reference numbers refer back to FIG. 1. A first column of spectrum units corresponds to a first spectrum map. This spectrum map represents spectrum units that are available to non-privileged entity W 110. A second column of spectrum units corresponds to a second spectrum map. This spectrum map represents spectrum units that are available to non-privileged entity Y 114. A third column of spectrum units corresponds to a third spectrum map. This spectrum map represents spectrum units that are available to non-privileged entity Z 116. In one case, any non-privileged entity can generate its spectrum map by scanning the spectrum for the presence of privileged entities. A non-privileged entity can also generate its spectrum map using other mechanisms. For example, a non-privileged entity can obtain information regarding privileged entities that constrain its operation from a database of any type, or from any other node or nodes, or from any other source (or from any combination of sources). For example, a non-privileged entity can assess its location using any mechanism (e.g., a GPS mechanism), and then consult such a geo-location database to determine privileged entities (and associated spectrum units used by these privileged entities) in its vicinity. That is, such a geo-location database may identify operating constraints on a location-by-location basis.

A channel assignment module (to be described in detail below) takes the logical intersection (e.g., logical OR) of the three spectrum maps to form an indication of spectrum that is available to non-privileged entities W 110, Y 114, and Z 116. In this case, the channel assignment module determines that the available spectrum includes spectrum units B, C, D, E and G, etc., as represented by the fourth column in FIG. 2. This scenario represents a simplified example; in general, the channel assignment module can combine spectrum maps with respect to a larger group of communication participants, respectively having more complex spectrum maps.

The channel assignment module next operates by selecting a channel from within the available spectrum on which to conduct communication. In doing so, the channel assignment module has multiple candidate channels to select from. To convey this point, consider the graphical illustration of FIG. 3. Here, the channel assignment module has determined that spectrum units labeled with "x" are not free to use, e.g., because they are currently being used by privileged entities. The remaining spectrum defines available spectrum for use in conducting communication among non-privileged entities. The channel assignment module can select a channel from any portion of the available spectrum.

By way of terminology, as explained above, a spectrum unit refers to an underlying portion of the spectrum, such as a pre-existed channel of the TV spectrum, each having a width of 6 MHz. One such representative spectrum unit is spectrum unit 302. Privileged entities communicate over these spectrum units. A channel refers to a portion of the available spectrum that the non-privileged entities use to conduct communication. A channel is associated with a center frequency and a width, as discussed below. In other words, while both spectrum units and channels serve the functional role of communication channels, the following explanation distinguishes between the two for reasons of clarity.

In one case, all of the channels have the same width. In another case, the channels can have varying channel widths. In other words, the channel widths need not all be the same. For example, in one case, the channel assignment module selects a channel which overlaps only a single spectrum unit. In another case, the channel assignment module selects a channel which overlaps two or more spectrum units.

Figure 3:
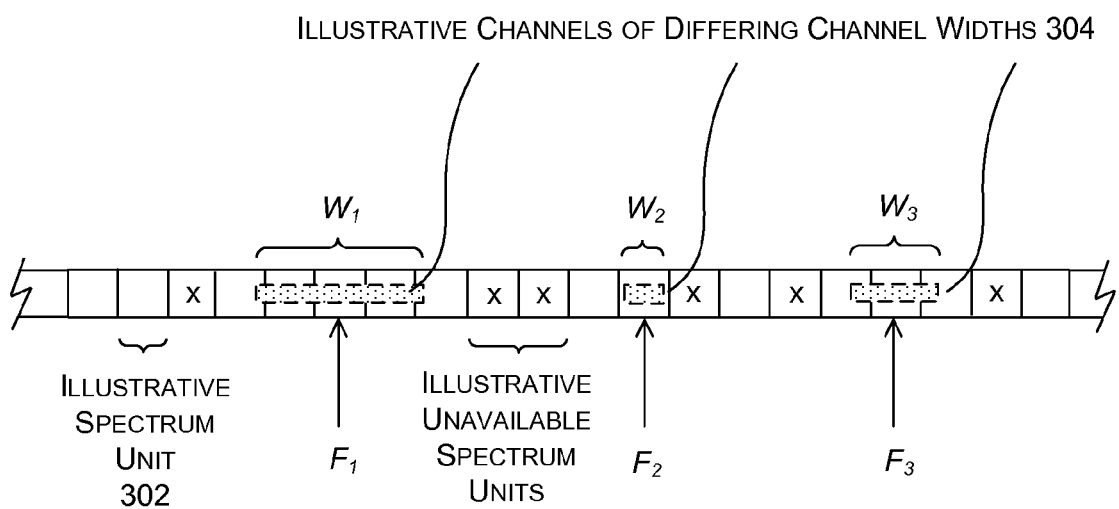
FIG. 3 shows an illustrative use of available spectrum to host channels of varying width.

For instance, consider the examples shown in FIG. 3, which shows illustrative channels 304 of varying width. A first channel has a width of 20 MHz and spans five spectrum units. A second channel has a width of 5 MHz and spans one spectrum unit. A third channel has a width of 10 MHz and spans three spectrum units. These examples are representative and non-limiting. In general, a channel can have any width that is accommodated by a portion of the available spectrum and can overlap any number of spectrum units.

Each channel is characterized by a width, W, and a center frequency, F. The width defines the frequency span of a channel, e.g., 5 MHz, 10 MHz, 20 MHz, etc. The center frequency defines the center point in the span of frequencies encompassed by the channel. In one case, the channel assignment module places the channel so that it coincides with a center frequency of an underlying spectrum unit, although other approaches may adopt a different placement rule.

A.2. Illustrative Communication Device

Advancing to FIG. 4, this figure shows an overview of a representative communication device 400 that can be used to implement any one of the non-privileged entities shown in FIG. 1. For example, the communication device can be used to implement the non-privileged entity W 110 (which, in one case, operates in a slave mode) or the non-privileged entity Z (which, in one case, operates in a master mode). The communication device 400 can correspond to, or can be integrated with, any type of device, or more generally, electrical processing functionality, such as a personal desktop computing device, a laptop computing device, a personal digital assistant (PDA) type computing device, a mobile phone type computing device, a game console device, a set-top box device, a router type device, a server type device, and so on.

The communication device 400 includes a wireless interaction module 402 for communicating with other devices via wireless (e.g., radio) communication. The wireless interaction module 402, in turn, can include a scanning module 404 and a main communication module 406. As part of a channel assignment procedure, the scanning module 404 can scan the spectrum (e.g., the TV spectrum) to discover the presence of available channels and the quality of the available channels. As part of a channel discovery procedure, the scanning module 404 can scan the appropriate spectrum (e.g., the TV spectrum) for the presence of an assigned operational channel, e.g., a channel associated with an access point device. As part of a disconnection handling procedure, the scanning module 404 can scan the spectrum for the presence of notification information. The notification information informs the communication device 400 that another communication device with which it is communicating has moved to another channel.

Figure 8:
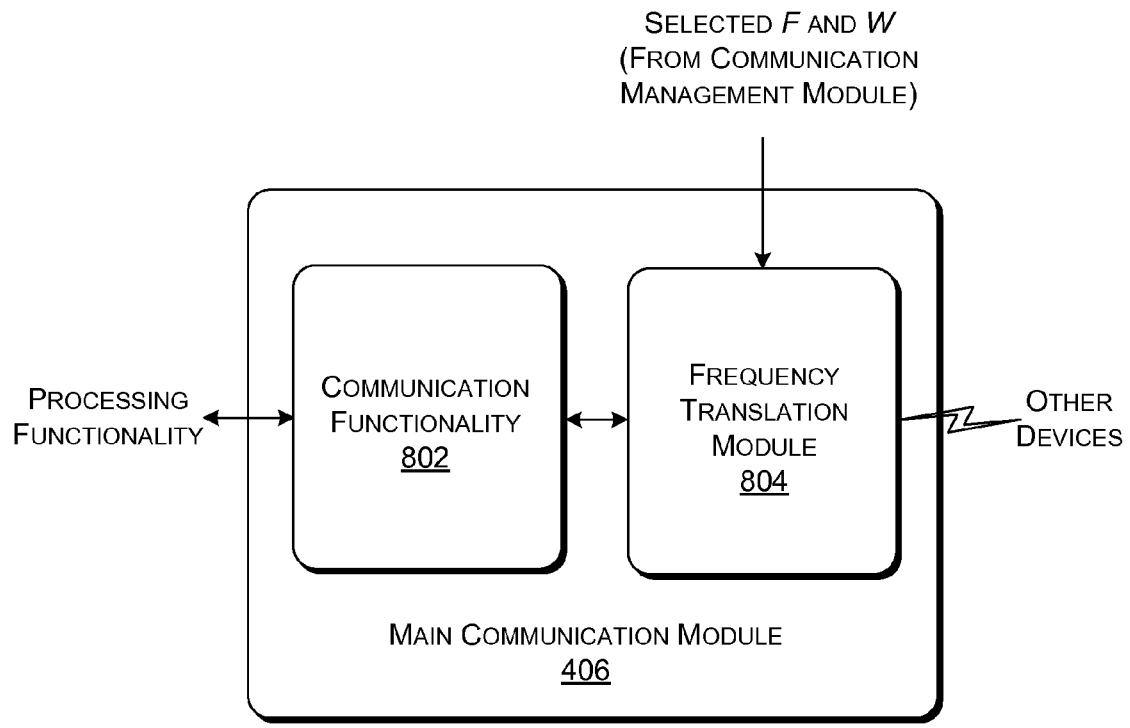
FIG. 8 shows an illustrative communication module for use in the communication device of FIG. 4.

The main communication module 406 enables the communication device 400 to transmit and receive data packets and non-data messages over a channel to one or more other communication devices. The main communication module 406 can be tuned to a channel having a specified center frequency and width. FIG. 8, to be discussed in turn, provides additional information regarding the operation of the main communication module 406. Any mechanism and method of wireless communication can be employed by the main communication module 406.

A number of modules process the information received from or sent to the wireless interaction module 402. For example, an incumbent detection module 408 detects the presence of privileged entities based on a signal provided to it by the scanning module 404. In one implementation, the incumbent detection module 408 performs this operation by detecting telltale patterns in the signal. The telltale patterns are indicative of the transmissions generated by privileged entities, e.g., television transmissions and wireless microphone transmissions. In one case, the incumbent detection module 408 can perform its analysis by operating on a version of the signal which has been transformed from the time domain to the frequency domain. (In addition, or alternatively, a non-privileged entity can determine the presence of privileged entities using other mechanisms, such as by consulting a geo-location database, as described above.)

Figure 5:
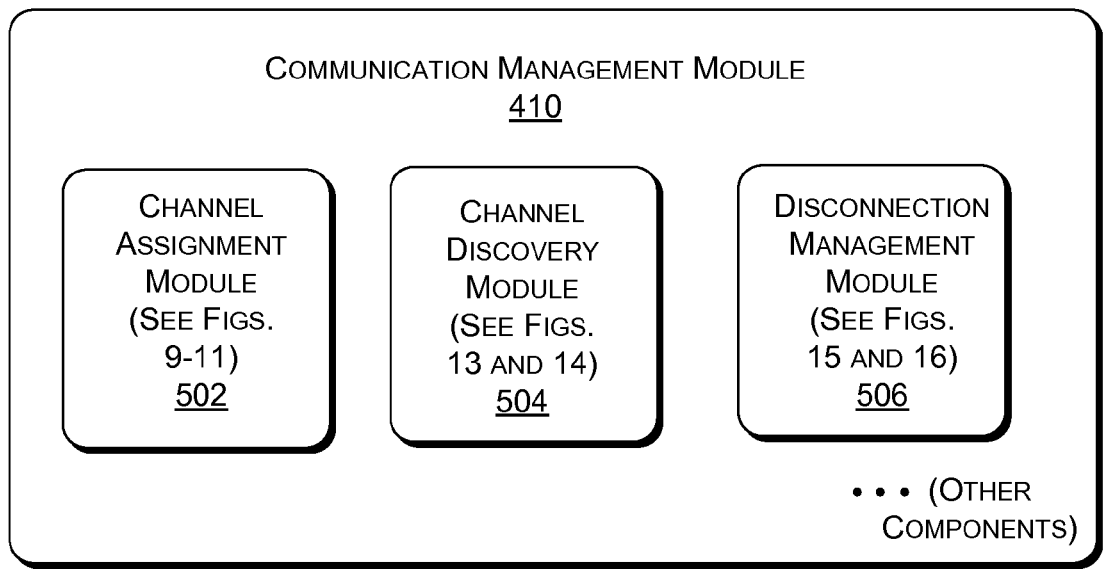
FIG. 5 shows a high-level view of an illustrative communication management module for use in the communication device of FIG. 4.

A communication management module 410 governs all aspects of the communication performed by the communication device 400. For example, advancing momentarily to FIG. 5, the communication management module 410 can include a channel assignment module 502, a channel discovery module 504, and a disconnection management module 506. The channel assignment module 502 selects an appropriate channel for use in communicating between one or more communication devices. The channel discovery module 504 discovers the presence of a channel that has already been assigned (e.g., a channel associated with an access point device). The disconnection management module 506 performs various tasks upon detecting that a previously assigned channel has been lost by one or more participants of a communication session (e.g., because the channel has been "taken over" by a privileged entity, or for some other reason). Section B (below) provides a detailed description of the illustrative operation of the channel assignment module 502 (with reference to FIGS. 9-11), the channel discovery module 504 (with reference to FIGS. 13 and 14), and the disconnection management module 506 (with reference to FIGS. 15 and 16). The " . . . " notation in FIG. 5 indicates that the communication management module 506 may encompass additional components, not illustrated in this drawing.

Returning to FIG. 4, an interface module 412 is used to interactively couple any type of processing functionality 414 with the other components of the communication device 400. For example, the interface module 412 may represent, in part, driver functionality used to send information to the wireless interaction module 402 and to receive information from the wireless interaction module 402. The processing functionality 414 may represent, for instance, any type of application module (not shown) provided by a computing device or the like. For example, the processing functionality 414 may represent a web browser program provided by a laptop computer device that sends data to, and receives data from, the wireless interaction module 402.

Figure 6:
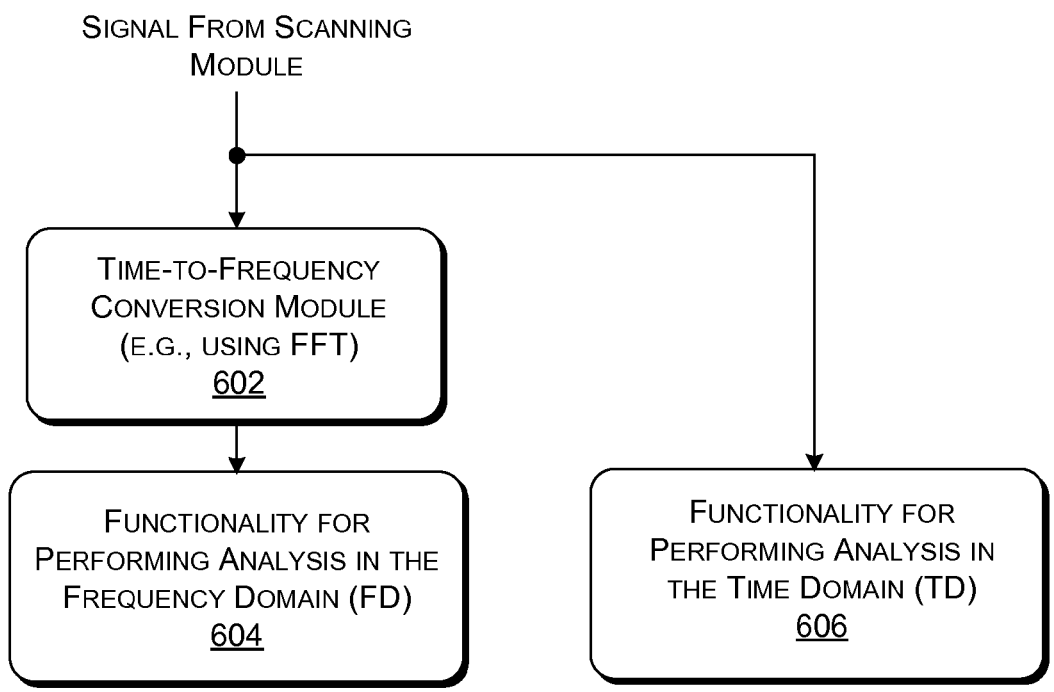
FIG. 6 shows functionality for providing time domain analysis and frequency domain analysis for use in the communication device of FIG. 4.

Advancing to FIG. 6, this figure shows a high-level view of processing that can be performed by the communication device 400 based on the signal received from the scanning module 404. A time-to-frequency conversion module 602 converts the signal from a time domain representation to a frequency domain representation, e.g., using a Fast Fourier Transform (FFT) technique or the like. The communication device 400 includes frequency domain (FD) functionality 604 for performing analysis on the signal in the frequency domain, as well as time domain (TD) functionality 606 for performing analysis on the signal in the original time domain. For example, the incumbent detection module 408 can use the FD functionality 604 for performing analysis in the frequency domain. The channel discovery module 504 and the disconnection management module 506 can use the TD functionality 606 for performing analysis in the time domain (as will be described later). The use of the TD functionality 606 for performing analysis in the time domain is, in some respects, more efficient than the FD functionality 604, e.g., because the TD functionality 606 does not require conversion of the signal into the frequency domain and analysis of the signal in the frequency domain.

Consider, for example, the use of the TD functionality 606 by the channel discovery module 504. In one possible strategy, the channel discovery module 504 can determine the width and center frequency of the channel by investigating each possible permutation of width and center frequency until it discovers a channel. That is, the channel discovery module 504 can use the main communication module 406 to successively tune to each possible center frequency and channel width and then "listen" on this candidate channel for the presence of beacon sent by an access point device or the like. This approach may be characterized as a one-to-one matching strategy, in which the channel discovery module 504 identifies a hypothetical "location" of a channel and then advances to a particular center frequency and channel width to determine whether the channel is actually present at that location.

The approach described above may involve processing a potentially large number of permutations. In one example, there are a total of thirty 5 MHz channels, twenty eight 10 MHz channels, and twenty six 20 MHz channels. This defines a relatively large number of candidate channels to investigate.

The channel discovery module 504 can apply a more efficient approach to detect a channel that is agnostic, at the outset, to the particular characteristics of the channel. In this approach, the channel discovery module 504 investigates the available spectrum by investigating spectrum units in successive fashion according to some search strategy (discussed in further detail below). At any given time, the channel discovery module 504 receives a signal from the scanning module 404 representing samples taken from a particular spectrum unit, e.g., a particular TV channel. Assume that the channel discovery module 504 detects a characteristic signal over this particular spectrum unit which reveals the presence of a channel. At this juncture, the channel discovery module 504 can draw the limited conclusion that the spectrum unit is at least part of a channel. One possibility is that the detected channel is entirely contained within the spectrum unit. But the channel can have a variable width which is not known a priori. So another possibility is that the channel extends over additional spectrum units.

In any case, through this process, the channel discovery module 504 has at least detected the presence of a channel without having to "try out" different channel widths and center frequencies in the manner described above. In other words, the channel discovery module 504 can methodically advance through the available spectrum on the basis of a single-width investigation unit, such as an investigation unit that corresponds to the size of an individual TV spectrum unit. And this entire analysis can be performed in the time domain based on the signal provided by the scanning module 404.

After having detected the presence of the channel, the channel discovery module 504 can derive additional information regarding the characteristics of the detected channel. For example, the channel discovery module 504 can infer at least the width of the channel using time domain analysis. In this approach, the channel discovery module 504 detects a telltale pattern (or patterns) in the signal received by the scanning module 404 over a particular spectrum unit. The channel discovery module 504 can then derive at least the channel width of the channel based on the characteristics of the telltale pattern.

Figure 7:
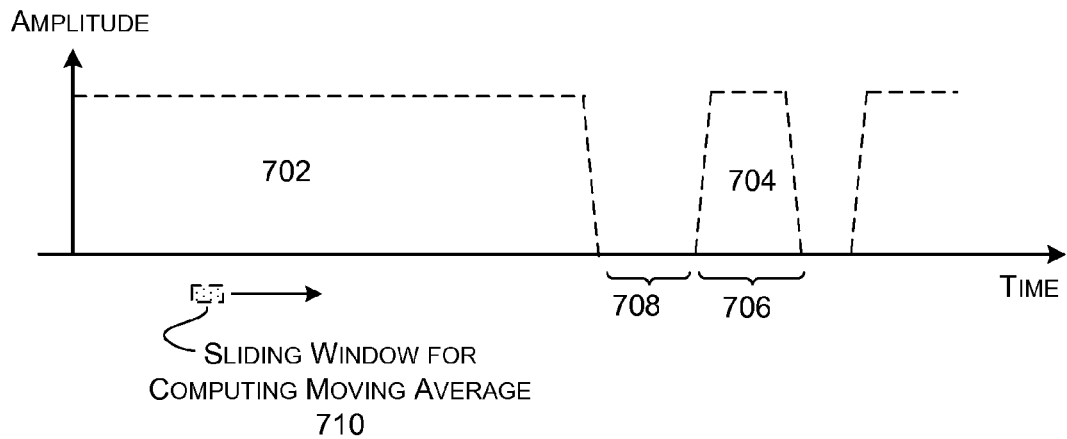
FIG. 7 is a graph which shows a high level view of a signal captured in the time domain; this graph serves as a vehicle for explaining various aspects of the operation of time domain analysis functionality shown in FIG. 6, as applied to the discovery of a channel.

Consider, for example, the signal of FIG. 7. The scanning module 404 provides raw samples of an RF signal, each sample associated with an (I, Q) pair. FIG. 7 shows a signal formed by plotting the amplitude of the samples ($\sqrt{I^2+Q^2}$) as a function of time. The signal includes one or more characteristic patterns therein which correlate with the width of the channel. For instance, in one merely illustrative case, the signal may reveal the transmission of a data packet 702 followed by the transmission of an acknowledgment message 704 having a width 706. An interval 708 separates the end of the data packet 702 from the start of the acknowledgement message 704. In one case, the width 706 of the acknowledgement message 704 and/or the width of the interval 708 may be proportion to an overall width of the channel being used. Based on this correlation, the channel discovery module 504 can infer the width of the channel by measuring the width 706 of the acknowledgment message 704 and/or the width of the interval 708. Section B will provide additional details regarding two search strategies that the channel discovery module 504 can use to discovery a channel using time domain analysis. After detecting the characteristics of the channel in the manner described above, the channel discovery module 504 can tune to the channel using the main communication module 406 and decode its beacon signal.

The example presented above applies to merely one particular illustrative protocol. In other protocols, other features of the signal may correlate to the characteristics (e.g., width and/or center frequency) of the channel. In general, note that the time domain analysis is efficient because it allows the channel discovery module 504 to determine the characteristics of the channel by investigating a single spectrum unit subsumed by the channel, e.g., without having to probe all possible permutations of channels.

The channel discovery module 504 can detect the characteristics of the signal in the time domain using a sliding window 710. That is, the channel discovery module 504 performs a moving average of the samples encompassed by the sliding window 710, and then performs detection based on the result of the moving average. This operation helps ensure that the channel discovery module 504 accurately detects patterns within the signal—that is, by not being influenced by errant signal events of short duration. The channel discovery module 504 can set the width of the sliding window 710 to be smaller than the width of the interval 708 and the width 706 of the acknowledgment message 704. This width allows the moving average to accurately detect the end of the data packet 702, the start of the acknowledgment message 704, the end of the acknowledgment message 704, etc. For example, the channel discovery module 504 can detect the end of a packet when the moving average drops below a prescribed threshold. The channel discovery module 504 can detect the start of a packet when the moving average rises about a prescribed threshold.

Consider next the use of the TD functionality 606 by the disconnection management module 506. The disconnection management module 506 can examine the signal generated by the scanning module 404 to determine a telltale signal associated with notification information, such as a chirp-type signal or the like. The chirp-type signal is sent by another communication device to notify the communication device 400 that it has lost its channel (e.g., because a privileged entity has "taken over" the channel). In one implementation, the telltale signal associated with the notification information can also encode the identity of the communication device which sent it. For example, the length of the telltale signal can be used to encode the identity of the sender. By detecting the identity of the sender, the disconnection management module 506 can determine, in the time domain, whether it has a prior communication relationship with the sender. If there is no communicative relationship, the disconnection management module 506 need not spend further time analyzing the signal.

The communication device 400 can make yet further use of the time analysis performed by the TD functionality 606. The examples set forth above are representative, non-exhaustive, and non-limiting.

Advancing to FIG. 8, this figure shows one illustrative implementation of the main communication module 406, as introduced in FIG. 4. The main communication module 406 transmits and receives data packets and non-data messages over a channel defined by a width W and a center frequency F. The main communication module 406 includes communication functionality 802 and a frequency translation module 804.

The communication functionality 802 formats information to be sent by the main communication module 406 and interprets information received by the main communication module 406. In one case, the communication functionality 802 operates in a frequency domain that may not coincide with the frequency domain of signals sent (and received) over the air. To accommodate this scenario, the main communication module 406 can include the frequency translation module 804. On a transmission path, the frequency translation module 804 either upconverts or downconverts the signals received by the communication functionality 802 to an appropriate frequency for transmission over the air. On a reception path, the frequency translation module 804 either upconverts or downconverts the signals received over the air to match the appropriate frequency expectations of the communication functionality 802.

The main communication module 406 also tunes to a particular channel defined by a particular channel width W and center frequency F. The main communication module 406 can perform this operation by adjusting one or more reference clocks and one or more associated phase locked loops (PLLs), etc. Changes in the channel width may affect various other characteristics of the operation of the main communication module 406. Hence, the main communication module 406 can also select appropriate parameter values as a function of the channel width, e.g., by a loading an appropriate parameter table or the like as a function of a selected channel width. One representative technology for adjusting channels widths is described in U.S. application Ser. No. 12/163,187, entitled "Adapting Channel Width for Improving the Performance of Wireless Networks," filed on Jun. 27, 2008, naming the inventors of Paramvir Bahl, Ranveer Chandra, Ratul Mahajan, Thomas Moscibroda, and Ramya Raghavendra.

In one particular representative implementation, aspects of the main communication module 406 can build upon pre-established functionality used for Wi-Fi functionality, operative in the ISM bands. In this case, the frequency translation module 804 can convert between signals appropriate to Wi-Fi communication to signals appropriate to TV spectrum communication. In another implementation, the main communication module 406 can provide appropriate functionality that is originally designed to operate in the TV spectrum (or other target spectrum) without adapting Wi-Fi functionality or other existing communication functionality.

B. Illustrative Processes

FIGS. 9-16 show procedures that explain the operation of the environment 100 and the communication device 400 in flowchart form. Certain principles underlying the operation of the environment 100 and communication device 400 have already been described in Section A; as such, certain operations will be addressed in summary fashion in this section.

B.1. Channel Assignment

Figure 9:
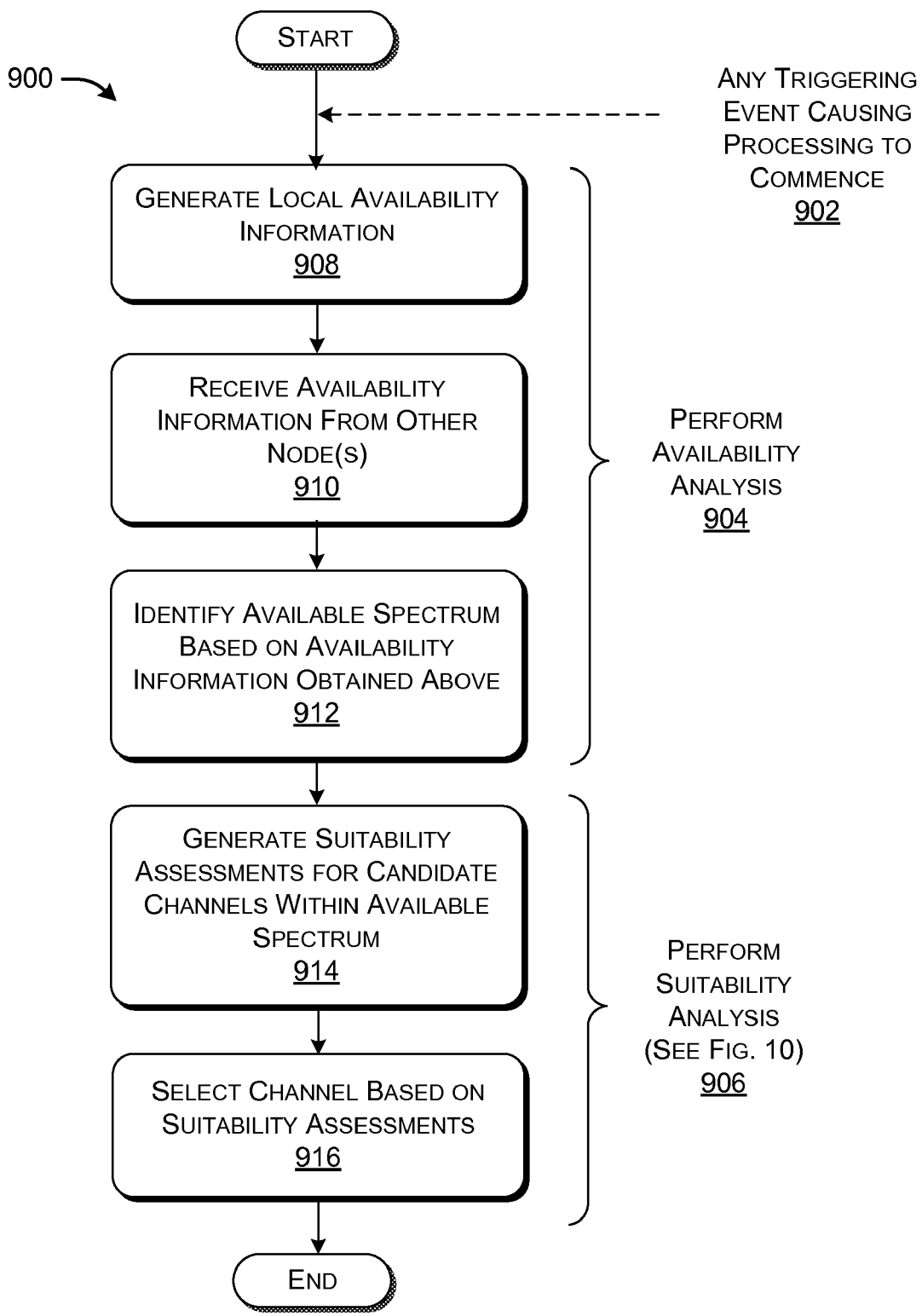
FIG. 9 shows an illustrative procedure that provides an overview of the operation of a channel assignment module of FIG. 5.

Starting with FIG. 9, this figure shows a procedure 900 for use by the channel assignment module 502 in selecting a channel from a collection of candidate channels within the available spectrum. This procedure 900 can be performed by any first node which is communication with a second node. However, to simplify and facilitate discussion, the procedure 900 is explained in the context of an access point device (such as non-privileged entity Z 116 of FIG. 1) which assumes the role of a master with respect to other communication devices with which it communicates.

To begin with, arrow 902 indicates that the access point device can initiate the procedure 900 in response to various triggering events. One event corresponds to the loss of an existing channel. A channel may be lost due to the appearance of a privileged entity that begins operating on that channel. In one case, the access point device may directly detect the loss of the channel. In another case, another communication device detects the loss of the channel and sends notification information to the access point device to alert it of the loss of the channel.

Another event corresponds to the deterioration of the channel, e.g., due to an increase of traffic on that channel, etc. This event may not equate to the outright loss of the channel; rather, it indicates that the channel has become undesirable relative to other channels (which have potentially better quality). In one implementation, the access point device can periodically examine the quality of its selected channel relative to other available channels, and initiate a switch if another channel has better performance.

Another event corresponds to the start up of the access point device. Still other events may trigger the initiation of the procedure 900.

In a first general phase 904 of operation, the access point device performs availability analysis. The access point device performs availability analysis to determine what portions of the spectrum that it is entitled to use. In one case, the access point device performs availability analysis to determine those portions of the spectrum that are not currently being used by privileged entities.

In a second general phase 906 of operation, the access point device performs suitability analysis to select an available channel from a group of candidate channels within the available spectrum (where the available spectrum has been defined by the availability analysis performed in the general phase 904). The access point device performs the suitability analysis by examining the suitability of the candidate channels and selecting the channel deemed most desirable.

Now examining each operation in turn within the procedure 900, in block 908, the access point device generates local availability information. The local availability information indicates the portions of the spectrum which are available to the access point device (that is, from the "perspective" of the access point device). The access point device can perform this operation by using the scanning module 404 and incumbent detection module 408 to detect the presence of privileged entities within the spectrum. The portions of the spectrum which are not occupied by privileged entities define local availability information from the perspective of the access point device. The access point device can also determine its spectrum map using any alternative mechanism discussed above.

In block 910, the access point device receives availability information from other communication devices (e.g., nodes) with which it has a communication relationship. Each of these other communication devices can form availability information in the manner described above, e.g., using its own scanning module 404 and incumbent detection module 408, or through some alternative mechanism discussed above. Each of the other communication devices can forward its availability information to the access point device in any manner, e.g., as a message in a main channel, a message in a backup channel, etc. However, when the access point device first starts up, it may not have any established relation with other communication devices. In this case, the access point device can select a channel without obtaining availability information from other communication devices.

In block 912, the access point device identifies spectrum that is available to all participants of a communication session. It performs this operation by taking the logical intersection of the availability information obtained in blocks 908 and 910. For example, the local availability information for each communication device can be expressed as a spectrum map, which, in turn, may take the form of a vector of 1's and 0's. A value of 0 may indicate that a spectrum unit is not available and a value of 1 may indicate that it is available. The access point can form a logical intersection of these spectrum maps to generate a final spectrum map which indicates the spectrum units which are available to all communication participants.

In block 914, the access point commences the suitability phase of its operation by computing a suitability assessment for each candidate channel within the available spectrum (determined in the availability analysis phase).

In block 916, the access point selects a channel on which to conduct communication. In one case, the access point selects a channel having a suitability assessment deemed to be most desirable.

Figures 10, 11:
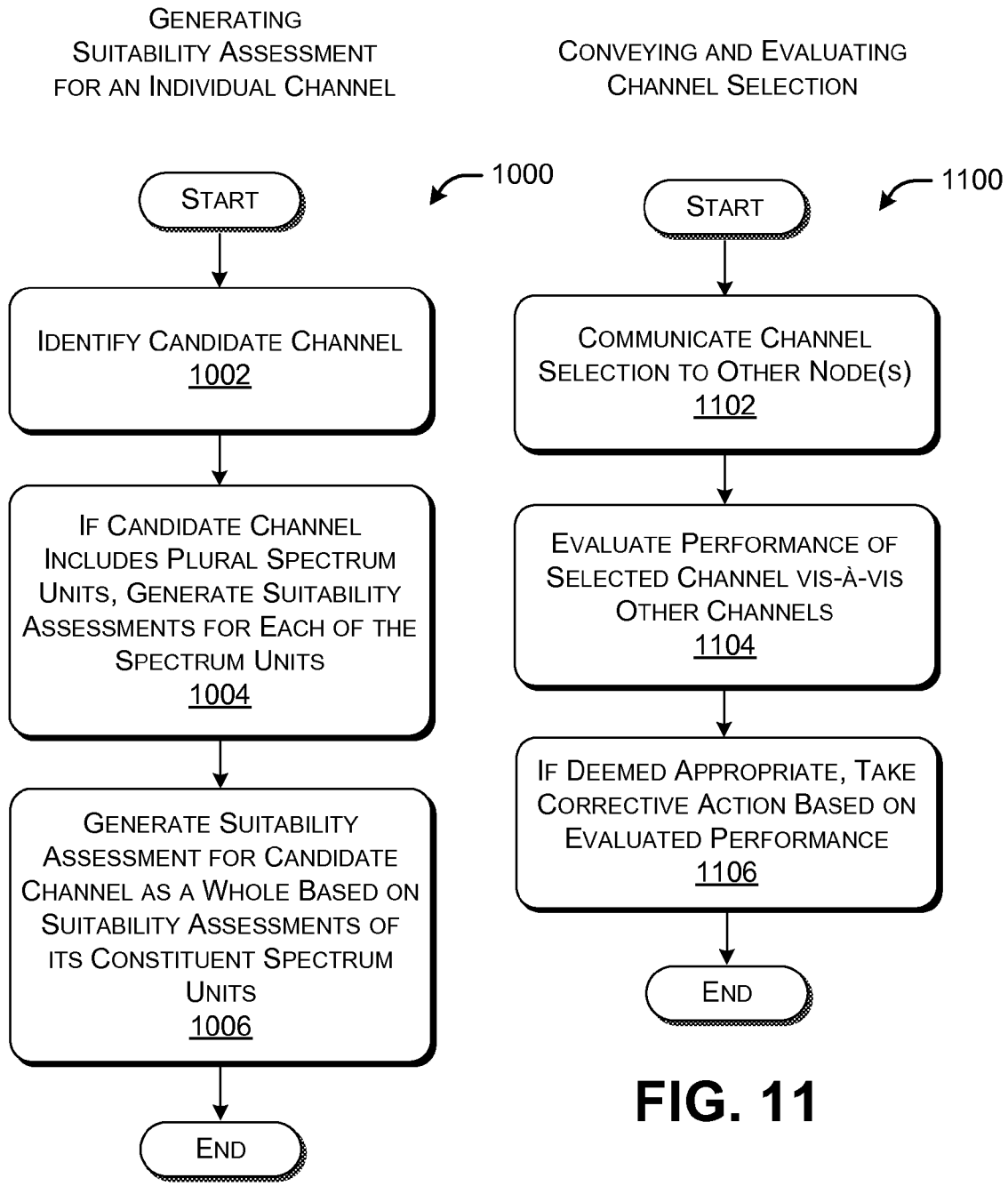
FIG. 10 shows an illustrative procedure that explains how the channel assignment module can be used to generate a suitability assessment for a channel.
FIG. 11 shows an illustrative procedure that explains how the channel assignment module can convey a channel selection to a communication participant, and how the appropriateness of the channel selection can be subsequently evaluated.

FIG. 10 shows a procedure 1000 which explains, in one illustrative and non-limiting case, how the channel assignment module 502 can generate a suitability assessment for each candidate channel.

In block 1002, the channel assignment module 502 can identify a candidate channel to investigate. Recall, based on the discussion of FIG. 3, that a channel can have any width and can span any number of underlying spectrum units (e.g., TV channels).

In block 1004, assume that the candidate channel under analysis spans two or more spectrum units (e.g., TV channels). In one case, the channel assignment module 502 proceeds by performing a suitability assessment for each individual spectrum unit. In one case, the channel assignment module 502 can compute the suitability assessment for a particular spectrum unit as:

$$\rho_n(c) = \max\left(1 - A_c^n, \frac{1}{B_c^n + 1}\right). \quad (1)$$

Here, $\rho_n(c)$ represents the suitability assessment of spectrum unit c from the perspective of a node n (e.g., the access point device). $A_c^n$ is a measure of airtime utilization of spectrum unit c from the perspective of a node n. $B_c^n$ is a number of other nodes or entities (e.g., other access point devices) competing with node n with respect to spectrum unit c. That is, this defines how many other entities that node n must contend with. Equation (1) indicates that the suitability assessment $\rho_n(c)$ for a particular spectrum unit is formed by taking the maximum of a first value (based on $A_c^n$) and a second value (based on $B_c^n$).

Less formally stated, $\rho_n(c)$ represents an expected share of spectrum unit c that node n will receive if the spectrum unit c is contained within a channel defined by center frequency F and width W. Equation (1) indicates that, at any instant in time, the probability that a node n will be able to transmit on the spectrum unit c is at least the residual airtime $1-A_c^n$. However, on each spectrum unit, a node n can also expect to get its "fair share" of the airtime when contending with other access point devices (as reflected by the value $1/(B_c^n+1)$). The channel assignment module 502 can take the maximum of these two values as an estimate of the probability that a node n will be able to use the spectrum unit c on each transmission opportunity.

The channel assignment module 502 can generate the airtime utilization measure $A_c^n$ by sampling the utilization of spectrum unit c using its scanning module 404. The channel assignment module 502 can define utilization based on any criterion or plural criteria. For example, the channel assignment module 502 can assess utilization based on the amount of information being transmitted over the spectrum unit in a given time interval. Alternatively, or in addition, the channel assignment module 502 can assess utilization based on the amount of time that a particular communication device is granted access to the spectrum unit, and so on. The channel assignment module 502 can provide an indication of the number of other nodes $B_c^n$ that are using the spectrum unit by detecting signals being transmitted over the spectrum unit by respective access point devices. The channel assignment module 502 can perform aspects of these measurements using the time domain analysis approach described above in Section A.

The channel assignment module 502 performs the above analysis for each spectrum unit c associated with a channel under investigation.

In block 1006, the channel assignment module 502 next forms a suitability assessment for the overall channel by combining the suitability assessments of its constituent spectrum units. In one approach, the channel assignment module 502 can generate the suitability assessment for a channel as:

$$MCham_n(F, W) = \frac{W}{SF} \prod_{c \in (F,W)} \rho_n(c). \quad (2)$$

Here, $MCham_n(F, W)$ is the suitability assessment for the candidate channel as a whole from the perspective of node n. The candidate channel has center frequency F and width W. SF is a scaling factor, e.g., in one case 5 MHz.

Less formally stated, since $\rho_n(C)$ represents the expected share of a TV spectrum unit c, the product of these shares across each TV spectrum in the channel (F, W) gives the expected share for the entire channel. This value is scaled by the optimal capacity of the probed channel, e.g., W=5 MHz in one case. That is, the approach uses a 5 MHz channel as a reference point because it fits into one single TV spectrum unit. In general, the $MCham_n(F, W)$ suitability assessment for any candidate channel is related to the current demands placed on the channel, ultimately reflecting the $A_c^n$ and $B_c^n$ measurements associated with its constituent spectrum units.

Consider two examples. In one case, assume that there is no background interference or other access point devices occupying any portion of the channel (F, W). Here, $Mcham_n(F, W)$ reduces to the optimal channel capacity. That is, $MCham_n(F, W)=1$ for W=5 MHz, 2 for W=10 MHz, and 4 for W=20 MHz.

In another example, consider a channel defined by (F, W=20 MHz). Out of the 5 TV spectrum units that are spanned by the channel, assume that three have no background interference, one has one competing access point device and airtime utilization of 0.9, and one has one competing access point device with airtime utilization 0.2. $MCham_n(F, 20 MHz)=4\cdot0.5\cdot0.8=1.6$. That is, the suitability assessment predicts a throughput on this channel that is equivalent to roughly 1.6 times an empty 5 MHz channel.

After computing the $MCham_n(F, W)$ suitability assessment for all candidate channels, the channel assignment module 502 can select the channel having the most desirable (e.g., best) suitability assessment.

FIG. 11 shows a procedure 1100 for conveying a channel selection to other communication participants and evaluating the performance of the channel selection.

In block 1102, the access point device communicates its channel selection to other communication devices with which it has a communicative relationship. The access point device can convey the channel selection using a beacon signal or other type of message. The communication devices can receive the channel selection on a backup channel, or using a discovery procedure (described below), etc. Upon receipt of the channel selection, the communication devices can use the channel when interacting with the access point device.

In block 1104, the access point device can evaluate the performance of the selected channel. The access point device can perform this evaluation in different ways. In one case, the channel assessment module 502 of the access point device can periodically scan other available channels and compute the above-described $MCham_n(F, W)$ suitability assessment for these other channels. The access point device can then compare the suitability assessment associated with the other channels with the channel that has been selected and is being used.

In one case, the access point device can determine the $MCham_n(F, W)$ suitability assessment for the selected channel based solely on its own measurements. In other words, the access point device can compute the $MCham_n(F, W)$ suitability assessment based on measurements made from the "perspective" of the access point device itself. In another case, the access point device can generate the $MCham_n(F, W)$ suitability assessment for the selected channel by taking into consideration measurements made by other communication devices.

For example, assume that, with reference to FIG. 1, non-privileged entity Z 116 is an access point device which communicates with non-privileged entity W 110 and non-privileged entity X 112 over a channel θ that has been selected as per the procedures of FIGS. 9 and 10. The non-privileged entity Z 116 can compute the efficiency of the selected channel θ based solely on its own computation of a $MCham_n(F, W)$ suitability assessment for the selected channel θ, in relation to $MCham_n(F, W)$ suitability assessments for other available channels. Alternatively, the non-privileged entity Z can also receive an $MCham_n(F, W)$ suitability assessment generated by non-privileged entity W 110 for the selected channel θ and an $MCham_n(F, W)$ suitability assessment generated by non-privileged entity X 112 for the selected channel θ. The non-privileged entity Z can then compute the final $MCham_n(F, W)$ suitability assessment for the selected channel θ by averaging the three suitability assessments provided by non-privileged entities Z 116, W 110, and X 112.

In another case, the access point device can perform the averaging procedure with respect to a plurality of available channels, including the selected channel. In this approach, each communication participant can compute the $MCham_n(F, W)$ suitability assessment for each candidate channel and transmit a set of $MCham_n(F, W)$ suitability assessments to the access point device. The access point device can then generate an average suitability assessment for each available channel and select the most appropriate channel based on average suitability assessments. For that matter, the procedure shown in FIG. 10 (in which an initial channel is selected) can also be modified to use the above-described averaging procedure. That is, the access point device can take the suitability assessments generated by other communication devices into account when selecting an initial channel.

In yet another implementation, the other communication devices can send their raw measurements (e.g., their $A_c''$ and $B_c''$ measurements) to the access point device, and the access point device can compute the $MCham_n(F, W)$ suitability assessments on behalf of the other communication devices (instead of requiring the other communication devices to generate the $MCham_n(F, W)$ suitability assessments). Still other implementations are possible.

In block 1106, the access point device takes appropriate corrective actions in response to the computations made in block 1104. For example, the access point device can decide to switch back to a previously-used channel (e.g., a channel in use before switching to a new channel). This is assuming that the previously-used channel was abandoned for quality reasons, not because it was "taken over" by a privileged entity.

B.2. Time Domain Analysis

Figure 12:
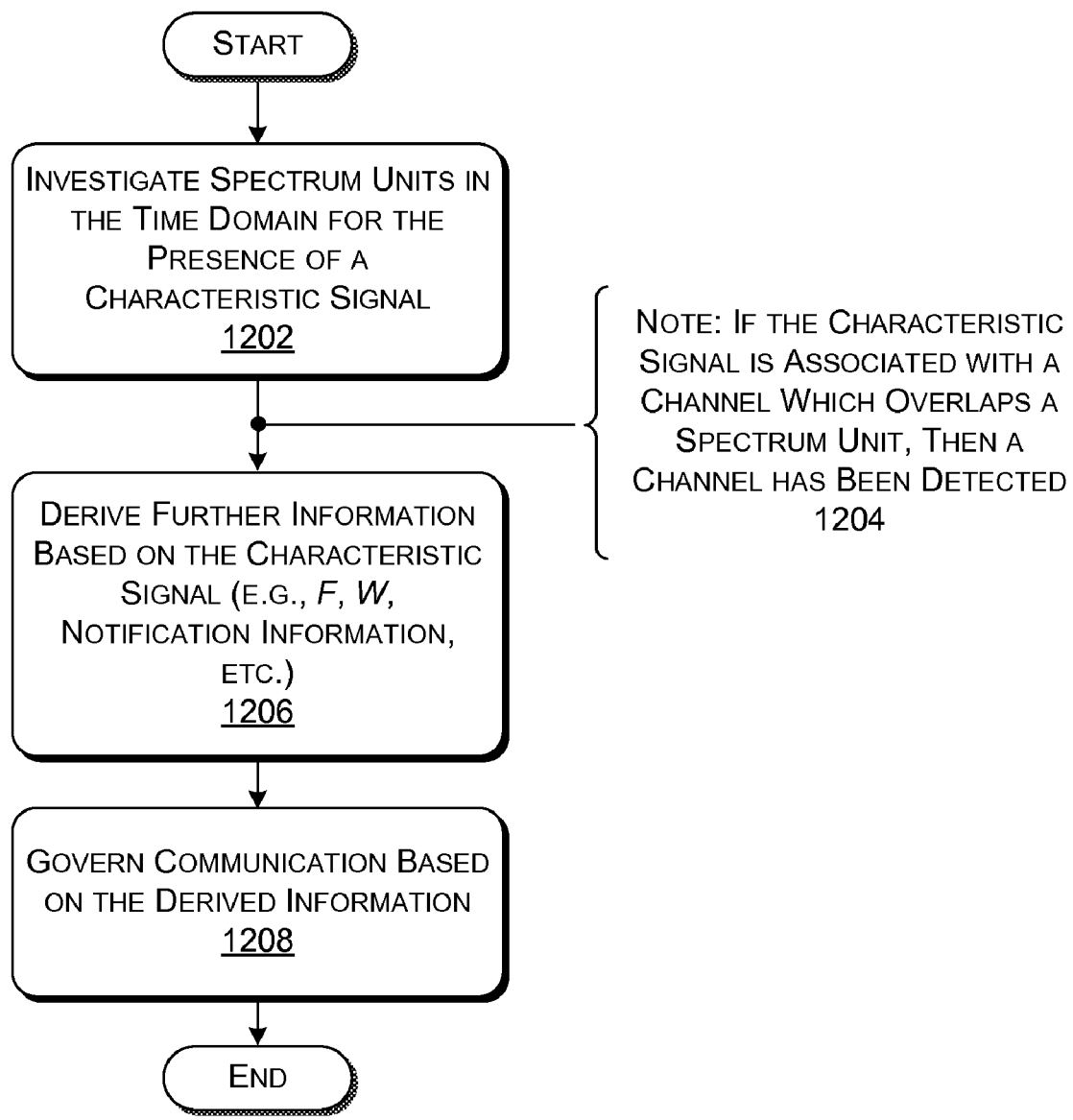
FIG. 12 shows an illustrative procedure that provides an overview of time domain analysis that can be performed by the communication device of FIG. 4.

FIG. 12 is a procedure 1200 that provides an overview of time domain processing that can be performed by the TD functionality 606 of any communication device. In one case, the channel discovery module 504 uses this analysis to detect a channel associated with an access point device. In another case, the disconnection management module 506 uses this analysis to detect notification information which alerts it to the fact that a communication device has lost is channel. Still other applications are possible.

In block 1202, a communication device investigates spectrum units in the time domain for the occurrence of a characteristic signal. As explained above, one such characteristic signal may be indicative of the presence of a communication channel that overlaps one of the spectrum units. The characteristic signal may further include a characteristic pattern that corresponds to the duration of certain messages, or the interval between different events, and so on. Another such characteristic signal corresponds to a signal that notifies the communication device of the loss of a channel, such as a chirping-type signal.

In block 1204, FIG. 12 addresses the case in which the characteristic signal corresponds to the presence of a channel. In this case, the channel discovery module 504 has successively detected the presence of a channel by examining an individual spectrum unit, even though the boundaries of the channel may not be defined by the spectrum unit itself (that is, for instance, the channel may extend over one or more additional spectrum units).

In block 1206, the communication device derives information based on the characteristic signal detected in block 1202. In one case, the communication device derives at least the width of the channel based on the characteristic signal detected in block 1202. In another case, the communication device forms a conclusion that a communication participant has lost its communication channel based on the characteristic pattern detected in block 1202.

In block 1208, the communication device governs some aspect of communication based on the information that has been derived in block 1204. For example, block 1206 may entail using a channel that has been detected in block 1204 to conduct communication among devices. Or block 1206 may entail invoking a procedure to establish another channel if it has been detected that a previous channel has been lost.

B.3. Channel Discovery

Figure 13:
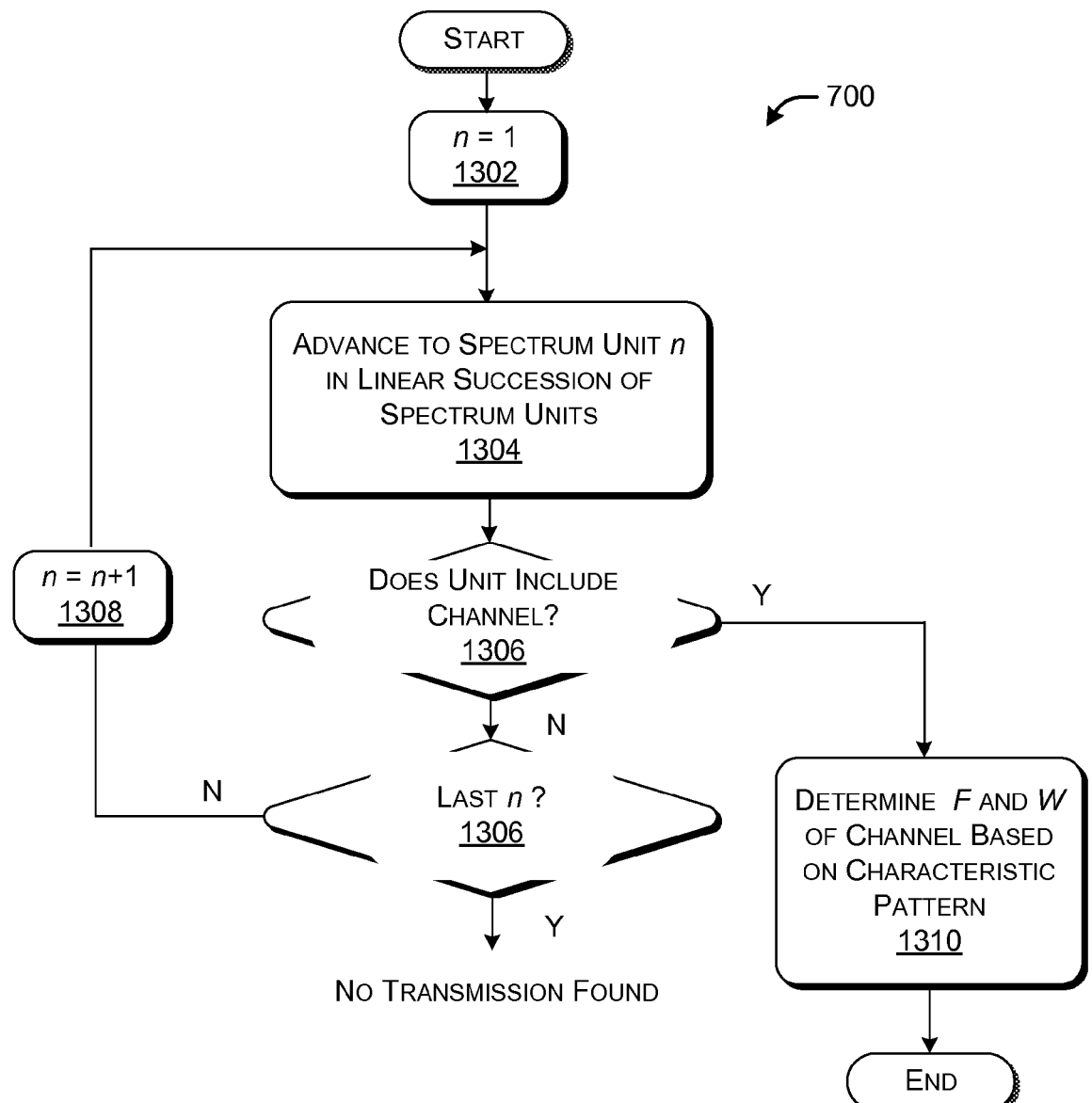
FIG. 13 shows an illustrative procedure that explains how a channel discovery module (of FIG. 5) can be used to discover a channel using a linear search strategy.

FIG. 13 shows a procedure 1300 for discovering a channel using a linear search strategy. In one representative and non-limiting case, this procedure may be performed by a communication device that is attempting to establish communication with an access point. In the case of FIG. 13 (and in the case of FIG. 14), the channel discovery module 504 can detect the presence of a channel from the "vantage point" of any individual spectrum unit that is part of the channel. Thus, the channel discovery module 504 can detect the presence of the channel by performing a scan of the available spectrum using a single-sized investigation unit in the time domain, rather than having to investigate different channel permutations using the one-to-one matching approach described above (in Section A).

In block 1302, the channel discovery module 504 of a communication device sets a spectrum unit index n to the integer value 1.

In block 1304, the channel discovery module 504 advances to the spectrum unit n in a linear sequence of spectrum units. At the outset, n=1, so the channel discovery module 504 examines the first spectrum unit in the sequence of spectrum units.

In block 1306, the channel discovery module 504 determines whether the spectrum unit n includes a channel, e.g., by determining whether a characteristic signal is detected over this spectrum unit. Assume at this juncture, that a determination is made that the spectrum unit does not include the channel.

In block 1308, the channel discovery module 504 determines whether the spectrum unit n is the last spectrum unit available for analysis. If so, and if a channel has not been detected, then the procedure terminates with the conclusion that no channel has been found. If the spectrum unit n is not the last spectrum unit, then, in block 1308, n is incremented by 1 and the above-described procedure is repeated with respect to the next spectrum unit n.

Assume that the channel discovery module 504 eventually discovers a channel being transmitted over at least part of a spectrum unit. If so, in block 1310, the channel discovery module 504 examines a characteristic pattern (or patterns) associated with the characteristic signal obtained from the spectrum unit. Namely, the channel discovery module 504 computes the width W of the channel based on the characteristic pattern. The width of the channel can be generated in the manner described above, e.g., by deriving the width from the length of an interval between a data packet and an acknowledgement message and/or the duration of the acknowledgment message itself.

Assume that the channel width W is detected based on analysis performed at a sampled frequency $F_s$. In general, the center frequency F of the channel occurs within an error bound $\pm E$ of $F_s$, where E corresponds to W/2. In the linear search strategy, the channel discovery module 504 progresses in orderly successive fashion from lower frequencies to higher frequencies. Hence, the center frequency F of the channel is conclusively given as $F_s+E$. Hence, in the linear search strategy, the channel discovery module 504 can compute both W and F from time domain analysis without decoding the signal.

After detecting the characteristics of the channel in the above-described manner, the channel discovery module 504 can tune to the channel and decode its beacon signal.

In the linear mode of discovery, the expected number of iterations until a channel is discovered is $N_{su}/2$, where $N_{su}$ is the number of spectrum units to be scanned, e.g., the number of TV channels to be scanned. In the worst case, the number of iterations is $N_{su}$.

Figure 14:
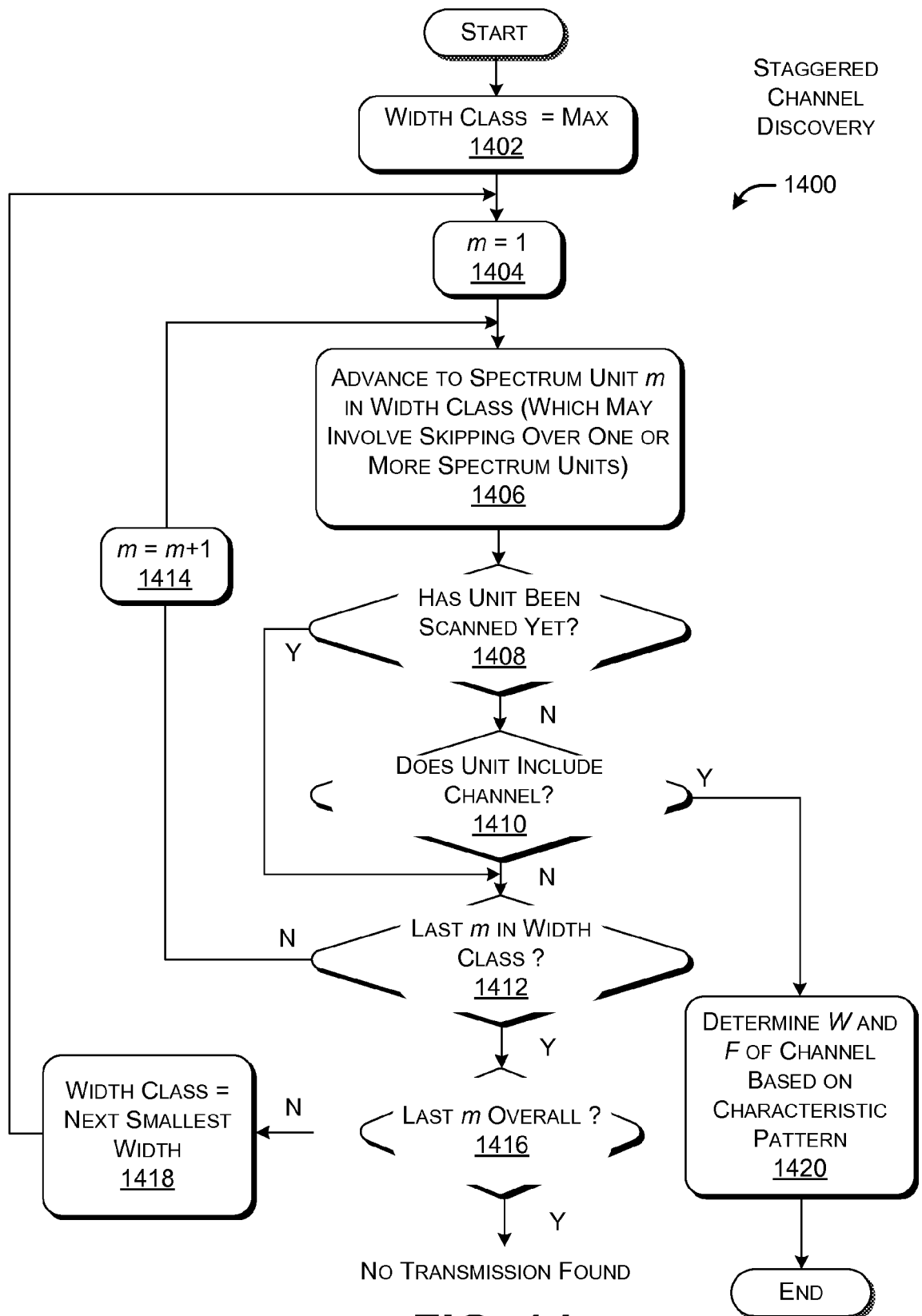
FIG. 14 shows an illustrative procedure that explains how the channel discovery module can be used to discover a channel using a staggered search strategy.

FIG. 14 shows a procedure 1400 for discovering a channel using a staggered search strategy. Again, in one scenario, this procedure may be performed by a communication device that is attempting to establish communication with an access point device. In this case, instead of investigating each spectrum unit in linear succession, the channel discovery module 504 examines the spectrum units on a width-class-by-width-class basis. That is, the channel discovery module 504 operates by first investigating the spectrum for the presence of a channel that has the largest possible channel width. If a channel of this nature is not found, the channel discovery module 504 investigates the spectrum for the presence a channel having the next-largest channel width. This process continues until the remaining unexamined spectrum units are investigated for the presence of a channel having the smallest possible channel width. Each possible channel width defines a channel width class.

In block 1402, the channel discovery module 504 sets a channel width index to correspond to a maximum possible channel width, such as 20 MHz (in one merely illustrative example).

In block 1404, the channel discovery module 504 sets an index m to an integer value of 1. The index m is used to sequence through a group of spectrum units associated with a particular width class.

In block 1406, the channel discovery module 504 advances to spectrum unit m in the selected width class. This operation may involve skipping over one or more spectrum units. For example, assume that the width class corresponds to a width of 20 MHz. In this case, the channel discovery module 504 advances through the available spectrum by skipping over four spectrum units at a time. The channel discovery module 504 does not investigate the spectrum units that it skips over until another iteration (that is, if that other iteration is eventually performed).

In block 1408, the channel discovery module 504 determines whether the spectrum unit that it has advanced to has already been investigated in a prior investigation (in a prior iteration). If so, then there is no need to investigate it again, and the procedure 1400 operates by skipping over this spectrum unit and advancing to the next spectrum unit in the width class.

In block 1410, presuming the spectrum unit has not yet been examined, the channel discovery module 504 determines whether the spectrum unit contains a channel, e.g., by determining whether it contains a characteristic signal associated with a channel. Assume, at this juncture, that the spectrum unit does not contain the channel.

In block 1412, the channel discovery module 504 determines whether the spectrum unit m is the last spectrum unit in the width class that is currently being examined, e.g., to begin with, the 20 MHz width class. If not, in block 1414, the channel discovery module 504 increases the index m to m+1, upon which it repeats the above-described operation. For example, for the case of the 20 MHz channel class, if the channel discovery module 504 has just examined spectrum unit x, it next examines spectrum unit x+5, because it skips over four spectrum units at each iteration for this width class.

Alternatively, presume that, in block 1410, the channel discovery module 504 determines that it has advanced to the last spectrum unit in a width class. If so, in block 1416, the channel discovery module 504 next asks whether the channel unit that it has reached is the overall last spectrum unit to be examined. If so, then the channel discovery module 504 terminates the procedure 1400, reaching the conclusion that a channel has not been found.

Alternatively, if the spectrum unit is not the overall last spectrum unit, then, in block 1418, the channel discovery module 504 decrements the class width index by 1. This prompts the channel discovery module 504 to repeat the above-described procedure for the next smallest channel width, such as 10 MHz. In the case of 10 MHz, the channel discovery module 504 sequences through the spectrum units by skipping over two spectrum units at a time. As stated above, if the channel discovery module 504 determines that it has already examined a spectrum unit in a prior iteration (e.g., for a prior class width), there is no need to reexamine it again. The channel discovery module 504 moves on to the next spectrum unit for that class width.

The above procedure advances by scanning through the spectrum units in succession, on a width-class-by-width-class basis. If a channel is not discovered, the channel discovery module 504 eventually reaches the smallest possible channel width, e.g., 5 MHz in one example.

Block 1420 is eventually invoked when the channel discovery module 504 eventually detects a channel that overlaps one of the spectrum units. The channel discovery module 504 can then infer the channel width based on time domain analysis of the characteristic pattern (or patterns) of the detected characteristic signal, as described above with respect to FIG. 7.

However, in the case of the staggered search strategy, the channel discovery module 504 has moved through the spectrum units in a staggered fashion, rather than a linear fashion as in the case of FIG. 13. This means that the channel discovery module 504 cannot conclusively determine the center frequency of the channel in the manner described above with respect to the linear mode of operation. Instead, the channel discovery module 504 can examine the spectrum in the vicinity of the detected channel to decode the beacon being transmitted over the channel. From this information, the channel discovery module 504 obtains the center frequency of the channel and other appropriate information. In other words, the channel discovery module 504 can narrow down the presence of the channel within a small range. The channel discovery module 504 can successively advance through different center frequencies within this range to discover the actual center frequency of the channel.

The expected discovery time of the staggered version of the discovery procedure can be shown to be $(1/N_W)(N_{su}+2^{N_W-1}+(N_W-1)/2)$. The expected number of iterations is $(N_{su}+4+1)/4$. Here, $N_{su}$ is the number of spectrum units to scan, and $N_W$ is the number of width class options to process (e.g., $N_W=3$ in the example shown in FIG. 3). Both algorithms have a worst-case discovery time of $N_W$.

B.4. Disconnection Management

Advancing to FIG. 15, this figure shows a procedure 1500 performed by the disconnection management module 506 to convey the loss of a channel. For example, a communication device may use this procedure 1500 to alert its access point device that it has lost it channel. One reason a communication device may lose its channel is because it is suddenly discovered that a privileged entity is transmitting using the channel (on any spectrum unit that overlaps the channel). This may be due to the fact that the privileged entity has just started transmitting. Or the privileged entity may have just moved into the vicinity of the communication device, and so on. In any case, the privileged entity "takes over" the channel.

In block 1502, the communication device detects that a privileged entity is now transmitting on the channel that the communication device is using to communicate with other communication participants. The communication device can make this determination using its scanning module 404 in conjunction with the incumbent detection module 408, or using some other mechanism. The communication device can discriminate a transmission that originates from a privileged entity from other communication based on a telltale signature associated with the transmission.

In block 1504, the communication device immediately disconnects from the channel it is using upon detecting a privileged entity.

In block 1506, the communication module sends notification information to its other communication participants, such as its access point device, to alert those devices of the loss of the channel. In one case, the communication module can use the main channel to send this message to the other participants, e.g., immediately before it abandons this main channel. In another case, the communication module can use a backup channel to send this message to the other participants. The access point device can, in advance, inform the communication device of the existence of this channel as part of its beacon message, or as part of another message. There is a risk that the backup channel is itself "taken over" by a privileged device and is therefore unavailable for use. In this case, the communication device can transmit the notification message over any other alternative channel.

In one case, the communication device can transmit the notification information using a chirping-type signal that the recipient device can readily interpret as a message which indicates loss of a channel. In one case, the notification information can also encode the identity of the communication device which is sending the notification information. For example, the communication device can encode the identity of the sender by modulating the length of the signal used to transmit the notification information.

FIG. 16 describes a procedure 1600 for detecting notification information sent by another communication device, and for taking action based on the notification information. For example, although not so limited, an access point device can perform the procedure 1600 upon receiving notification information from one of its communication devices.

In block 1602, the access point device detects notification information from a communication device. In one case, the access point device performs this operation by periodically scanning its backup channel, and also alternative channels. It can perform this task using the scanning module 404 in conjunction with the type of time domain analysis described above. In this manner, the detection operation does not unduly interfere with other communication tasks performed by the access point device. Once the access point device detects the notification information (e.g., a chirping-type signal), it can tune the main communication module 406 to the backup channel and decode the contents of the chirp signal.

In block 1604, the access point device invokes the channel assignment procedure described above to assign another channel for use in conducting communication with its communication devices. The other communication devices can communicate their spectrum maps and the like to the access point device via the backup channel.

In block 1606, the access point device can convey the new channel selection to its communication devices, e.g., within a beacon signal transmitted by the access point device or using some other message transmitted by the access point device.

C. Representative Processing Functionality

FIG. 17 sets forth illustrative electrical processing functionality 1700 that can be used to implement any aspect of the functions described above. With reference to FIG. 4, for instance, the type of processing functionality 1700 shown in FIG. 17 can be used to implement any aspect of the communication device 400. In one case, the processing functionality 1700 may correspond to any type of computing device that includes one or more processing devices.

The processing functionality 1700 can include volatile and non-volatile memory, such as RAM 1702 and ROM 1704, as well as one or more processing devices 1706. The processing functionality 1700 also optionally includes various media devices 1708, such as a hard disk module, an optical disk module, and so forth. The processing functionality 1700 can perform various operations identified above when the processing device(s) 1706 executes instructions that are maintained by memory (e.g., RAM 1702, ROM 1704, or elsewhere). More generally, instructions and other information can be stored on any computer readable medium 1710, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1700 also includes an input/output module 1712 for receiving various inputs from a user (via input modules 1714), and for providing various outputs to the user (via output modules). One particular output mechanism may include a presentation module 1716 and an associated graphical user interface (GUI) 1718. The processing functionality 1700 can also include one or more network interfaces 1720 for exchanging data with other devices via one or more communication conduits 1722. One or more communication buses 1724 communicatively couple the above-described components together.

Although the functionality has been described in the illustrative context of any environment that is shared between privileged and non-privileged entities, aspects of the functionality can also be applied in other environments that do not have this characteristic.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium not consisting of a signal per se and having stored thereon computer-executable instructions that, when executed, cause the performance of a disconnection management, comprising:
   detecting a presence of a privileged entity operating on a channel that is being used by a first node to communicate with a second node, the first node and the second node being associated with non-privileged entities, the non-privileged entities having subordinate access rights compared to the privileged entity;
   disconnecting the first node from the channel; and
   sending notification information to a second node that indicates that the first node has disconnected from the channel.

2. The medium of claim 1, wherein, in the sending notification information, the notification information is sent to the second node via a backup channel.

3. The medium of claim 1, wherein, in the sending notification information, the notification information is sent to the second node via an alternative channel when a backup channel is not available.

4. The medium of claim 1, further comprising detecting notification information sent by the second node to the first node, the notification information sent by the second node indicating that the second node has detected loss of the channel.

5. The medium of claim 4, wherein, in the detecting notification information, a time domain analysis is used to detect the notification information sent by the second node.

6. A disconnection management method, comprising:
   detecting a presence of a privileged entity operating on a channel that is being used by a first node to communicate with a second node, the first node and the second node being associated with non-privileged entities, the non-privileged entities having subordinate access rights compared to the privileged entity;
   disconnecting the first node from the channel; and
   sending notification information to a second node that indicates that the first node has disconnected from the channel.

7. The method of claim 6, wherein, in the sending notification information, the notification information is sent to the second node via a backup channel.

8. The method of claim 6, wherein, in the sending notification information, the notification information is sent to the second node via an alternative channel when a backup channel is not available.

9. The method of claim 6, further comprising detecting notification information sent by the second node to the first node, the notification information sent by the second node indicating that the second node has detected loss of the channel.

10. The method of claim 9, wherein, in the detecting notification information, a time domain analysis is used to detect the notification information sent by the second node.

11. A disconnection management device, comprising:
   a detecting section that detects a presence of a privileged entity operating on a channel that is being used by a first node to communicate with a second node, the first node and the second node being associated with non-privileged entities, the non-privileged entities having subordinate access rights compared to the privileged entity;
   a disconnecting section that disconnects the first node from the channel; and
   a sending section that sends notification information to a second node that indicates that the first node has disconnected from the channel.

12. The device of claim 11, wherein the sending section sends the notification information to the second node via a backup channel.

13. The device of claim 11, wherein the sending section sends the notification information to the second node via an alternative channel when a backup channel is not available.

14. The device of claim 11, further comprising a notification information detecting section that detects notification information sent by the second node to the first node, the notification information sent by the second node indicating that the second node has detected loss of the channel.

15. The device of claim 14, wherein the notification information detecting section uses a time domain analysis to detect the notification information sent by the second node.

* * * * *